US011042586B2

(12) United States Patent
Hohwald et al.

(10) Patent No.: US 11,042,586 B2
(45) Date of Patent: Jun. 22, 2021

(54) CLUSTERING SEARCH RESULTS BASED ON IMAGE COMPOSITION

(71) Applicant: SHUTTERSTOCK, INC., New York, NY (US)

(72) Inventors: Heath Hohwald, Logrono (ES); Lawrence Lazare, Croton, NY (US)

(73) Assignee: Shutterstock, Inc., New York, NY (US)

(*) Notice: Subject to any disclaimer, the term of this patent is extended or adjusted under 35 U.S.C. 154(b) by 328 days.

(21) Appl. No.: 15/394,783

(22) Filed: Dec. 29, 2016

(65) Prior Publication Data
US 2018/0189325 A1   Jul. 5, 2018

(51) Int. Cl.
*G06F 16/00* (2019.01)
*G06F 16/583* (2019.01)
*G06F 16/51* (2019.01)
*G06F 16/9038* (2019.01)
*G06F 16/9535* (2019.01)
*G06K 9/62* (2006.01)
(Continued)

(52) U.S. Cl.
CPC ...... *G06F 16/5838* (2019.01); *G06F 3/04817* (2013.01); *G06F 3/04842* (2013.01); *G06F 16/51* (2019.01); *G06F 16/9038* (2019.01); *G06F 16/9535* (2019.01); *G06K 9/00677* (2013.01); *G06K 9/4628* (2013.01); *G06K 9/4671* (2013.01); *G06K 9/6218* (2013.01); *G06K 9/6269* (2013.01); *G06K 9/6274* (2013.01); *G06N 3/0454* (2013.01); *G06N 3/08* (2013.01)

(58) Field of Classification Search
CPC .................. G06F 17/30; G06F 16/00
See application file for complete search history.

(56) References Cited

U.S. PATENT DOCUMENTS 6,240,424 B1 * 5/2001 Hirata ................ G06F 16/5846
707/749
8,352,465 B1   1/2013 Jing et al.
(Continued)

OTHER PUBLICATIONS

International Search Report and Written Opinion from PCT/US2017/068573, dated Apr. 23, 2018, 14 pages.

*Primary Examiner* — Farhan M Syed
(74) *Attorney, Agent, or Firm* — McDermott Will & Emery LLP

(57) ABSTRACT

Various aspects of the subject technology relate to systems, methods, and machine-readable media for clustering search results based on image composition. A system may, for each image in a set of images, determine a compositional vector representing one or more objects and corresponding locations within the image using a trained computer-operated convolutional neural network. The system may provide each image through a clustering algorithm to produce one or more clusters based on compositional similarity. The system may provide images from the set of images clustered by composition, in which the images include a different listing of images for each of the one or more clusters. The system may provide a prioritized listing of images responsive to a user search query, in which the prioritized listing of images includes a different listing of images for each cluster of compositional similarity based on the metadata of each image associated with the cluster.

20 Claims, 21 Drawing Sheets

(51) Int. Cl.
*G06K 9/46* (2006.01)
*G06K 9/00* (2006.01)
*G06N 3/04* (2006.01)
*G06F 3/0481* (2013.01)
*G06F 3/0484* (2013.01)
*G06N 3/08* (2006.01)

(56) References Cited

U.S. PATENT DOCUMENTS

| | | | |
|---|---|---|---|
| 8,484,233 B2 * | 7/2013 | Xie | G06F 16/242 707/758 |
| 8,718,383 B2 * | 5/2014 | Valencia-Campo | G06F 16/5838 382/218 |
| 9,311,531 B2 * | 4/2016 | Amtrup | G06K 9/00536 |
| 9,411,896 B2 * | 8/2016 | Frank | G06F 16/48 |
| 9,445,072 B2 * | 9/2016 | Stefanoski | G06T 5/50 |
| 9,684,655 B2 * | 6/2017 | Frank | G06F 16/951 |
| 2006/0101060 A1 | 5/2006 | Li et al. | |
| 2007/0198951 A1 * | 8/2007 | Frank | G06F 16/48 715/838 |
| 2007/0219968 A1 * | 9/2007 | Frank | G06F 16/951 |
| 2010/0034470 A1 * | 2/2010 | Valencia-Campo | G06K 9/6229 382/218 |
| 2010/0332210 A1 | 12/2010 | Birdwell et al. | |
| 2011/0317923 A1 | 12/2011 | Hondo et al. | |
| 2012/0106859 A1 * | 5/2012 | Cheatle | G11B 27/28 382/225 |
| 2014/0079297 A1 * | 3/2014 | Tadayon | G06K 9/00288 382/118 |
| 2014/0201219 A1 | 7/2014 | Kim et al. | |
| 2014/0270536 A1 * | 9/2014 | Amtrup | G06K 9/00483 382/195 |
| 2016/0342595 A1 * | 11/2016 | Frank | G06F 16/9537 |
| 2017/0098152 A1 * | 4/2017 | Kerr | G06F 3/04842 |
| 2017/0249339 A1 * | 8/2017 | Lester | G06F 16/56 |
| 2017/0351672 A1 * | 12/2017 | Frank | G06F 16/951 |
| 2018/0189325 A1 * | 7/2018 | Hohwald | G06N 3/0454 |

* cited by examiner

CLUSTERING SEARCH RESULTS BASED ON IMAGE COMPOSITION

BACKGROUND

Field

The present disclosure generally relates to a computer-operated image retrieval system, and more particularly to clustering search results based on image composition.

Description of the Related Art

When a user performs a search of a collection of items using a search query, an information retrieval (IR) system commonly matches a user's search terms with content items from the collection that are most relevant to a user's query. The problem of finding a desired multimedia item in a very large collection can be quite daunting. When searching for images, it is common to not only desire a specific subject matter present in the image (e.g. an image with a person present) but also find the subject matter located in a specific location in the image. With potentially hundreds of millions of items, the task for the IR system of indicating to a user the item (e.g., image or images) that closely matches the semantic concept and its location within the item that the user had in mind is challenging.

SUMMARY

The present disclosure describes a system that maps an input search query to a saliency map that identifies both the contents (and objects) present in an image as well as their location in the image, which goes beyond textual querying for indicating compositional intentions. This mapping can be used to provide clustering search results based on image composition that allows a user to supply a text-based location or relative position within the image that should contain certain visual content. This enables the user to search for images with important objects in a desired location within the image. The disclosed system automatically clusters images into compositionally similar groups, presents compositional search filters to have the user indicate which compositions are of interest, and applies personalized compositional preferences to search results.

According to one embodiment of the present disclosure, a computer-implemented method is provided. The method includes, for each image in a set of images, determining a compositional vector representing one or more objects and corresponding locations within the image using a trained computer-operated convolutional neural network. The method includes providing each image through a clustering algorithm to produce one or more clusters based on compositional similarity. The method includes providing images from the set of images clustered by composition, the images including a different listing of images for each of the one or more clusters. The method also includes providing a set of search results responsive to a user search query to a client device, the set of search results including a prioritized listing of the images from each cluster of compositional similarity.

According to one embodiment of the present disclosure, a system is provided including one or more processors and a computer-readable storage medium coupled to the one or more processors, the computer-readable storage medium including instructions. The instructions cause the one or more processors to, for each image in a set of images, determine a compositional vector representing one or more objects and corresponding locations within the image using a trained computer-operated convolutional neural network. The instructions also cause the one or more processors to provide each image through a clustering algorithm to produce one or more clusters based on compositional similarity. The instructions also cause the one or more processors to provide images from the set of images clustered by composition, the images including a different listing of images for each of the one or more clusters. The instructions also cause the one or more processors to store metadata with each image in an image collection, the metadata indicating a compositional class for the image. The instructions also cause the one or more processors to provide, for transmission, a prioritized listing of images responsive to a user search query, the prioritized listing of images including a different listing of images for each cluster of compositional similarity based on the metadata of each image associated with the cluster.

According to one embodiment of the present disclosure, a non-transitory computer readable storage medium is provided including instructions that, when executed by a processor, cause the processor to perform a method. The method includes, for each image in a set of images, determining a compositional vector representing one or more objects and corresponding locations within the image using a trained computer-operated convolutional neural network. The method includes providing each image through a clustering algorithm to produce one or more clusters based on compositional similarity. The method includes providing images from the set of images clustered by composition, the images including a different listing of images for each of the one or more clusters. The method also includes providing a set of search results responsive to a user search query to a client device, the set of search results including a prioritized listing of the images from each cluster of compositional similarity.

According to one embodiment of the present disclosure, a system is provided that includes means for storing instructions, and means for executing the stored instructions that, when executed by the means, cause the means to perform a method. The method includes, for each image in a set of images, determining a compositional vector representing one or more objects and corresponding locations within the image using a trained computer-operated convolutional neural network. The method includes providing each image through a clustering algorithm to produce one or more clusters based on compositional similarity. The method includes providing images from the set of images clustered by composition, the images including a different listing of images for each of the one or more clusters. The method also includes providing a set of search results responsive to a user search query to a client device, the set of search results including a prioritized listing of the images from each cluster of compositional similarity.

According to one embodiment of the present disclosure, a computer-implemented method is provided. The method includes receiving user input via an application on a client device to initiate an image search, in which the user input indicates one or more queries that define a specific composition for an image. The method includes generating, in response to the received user input, an image search query from the received user input. The method includes providing for transmission the image search query over a connection to a server, in which the server includes an image search service that obtains a set of images responsive to the image search query based on a cosine similarity between a compositional vector associated with the image search query and one or more compositional vectors of corresponding images from an image collection, and the image search service clustering the set of images based on composition similarity using a clustering algorithm associated with a defined distance function. The method also includes receiving a set of search results responsive to the image search query from the server, the set of search results including a prioritized listing of images clustered by composition.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
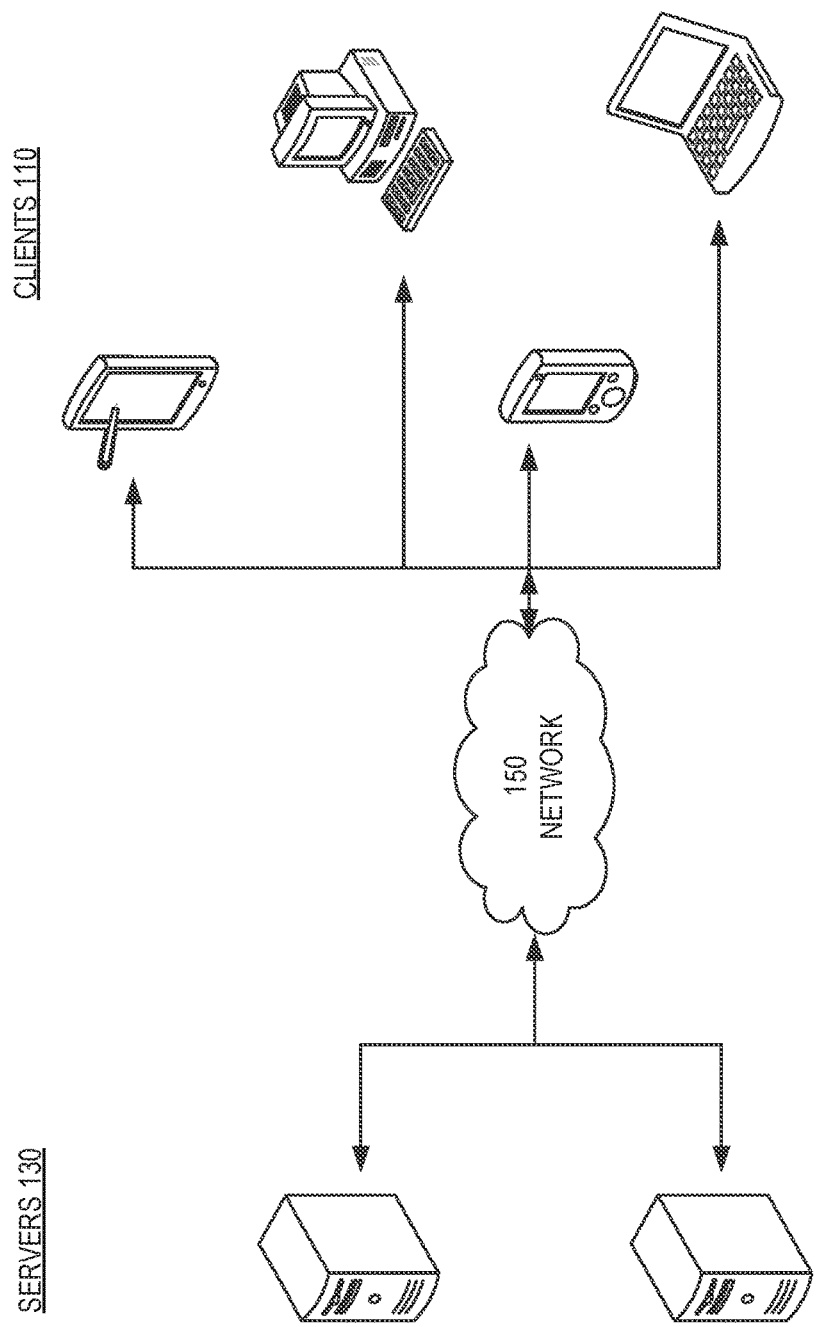
FIG. 1 illustrates an example architecture for clustering search results based on image composition suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object) is deemed most useful for a neural network to perform the classification task. The term "saliency map" as used herein may refer to a mapping where each pixel has an associated value with its particular saliency value, where the saliency value of a pixel may refer to as the normalized attention that the pixel has in the overall scene. The term "training data" as used herein may refer to as a set of images containing positive instances of desired classes used to train an object classifier.

General Overview

A very common workflow for a user of an image retrieval (IR) system is beginning with a mental conception of an ideal image for a particular purpose. The user then issues a textual query to the IR system where the query is intended to capture in words their mental conception. The IR system then returns a set of images, at which point the user browses through the images, many of which are likely irrelevant, hoping to find one that is relevant. Composition is often an important factor in identifying a relevant image. Moreover, it is distracting to users to look at entire images when the factor they care about may be a certain composition of the image.

When searching for images, it is common to not only desire a specific subject matter present in the image (e.g. an image with a person present) but also find the subject matter located in a specific location in the image. As an example, consider a user searching for an image with a representation of a close-up of a "woman" located on the left side of the image. In traditional IR systems, the first recourse may be to query for "woman" and then require the user to manually sift through a large number of images where the subject is not on the left side of the image. This can eventually be successful but there is a lot of lost energy passing over a large proportion of images not relevant to the user's intent. A different method of trying to better indicate user intent would be to query for "woman on left" instead. Typically this is not an effective strategy since query understanding is often limited in traditional IR systems, so the "on left" modifier is not well understood by the traditional IR systems and the results are often no better, and possibly worse, than simply querying for "woman".

The disclosed system can automatically cluster all images into compositionally similar groups. For example, the disclosed system can cluster search results into three compositional classes: subject on the left, subject centered, or subject on the right. Visually, the user is presented with results from each cluster in a separate row so that the user can then focus only on the composition that interests them. The clusters can be based on either offline processing, where each image is tagged with a compositional tag (e.g. "subject_left"), or determined in a post-processing stage after the search results for the query are generated ignoring composition. In this case, a clustering algorithm (e.g., k-means) is run on only the relevant results and may produce different clusters than in the offline case since the set of images would be reduced and may not have images in certain compositional arrangements.

The disclosed system also can present compositional search filters for visually supporting the user in identifying images with a certain composition. At query time, it is typical to allow users to specify filters such as image orientation (e.g., horizontal, vertical) or image type (e.g., illustration, vector, image). A compositional filter may be presented that allows the user to select from a grid of compositional options, e.g. head or body shot on one axis and left, center, or right on another axis. If the user selects "head shot, left" and queries for "woman", then only images having a representation of women headshots appearing on the left would be presented, filtering out all other images.

In order to not restrict the filter options to only a subset of predetermined logical choices, the disclosed system can learn commonly desired compositional arrangements by mining user behavioral logs. For example, if analyzing the most commonly downloaded images for the query "group people" reveals that a composition with three people is common, with two people in the foreground and one in the background, and then an additional compositional filter can be presented to the user allowing them to select this filter. In one or more implementations, the disclosed system allows users to describe an ideal composition using a predetermined number of icons in a tool bar for filtering the search results. The disclosed system enables the user to drag icons from the tool bar onto a canvas and then position and resize the icons to the user's preferences to indicate what the intended composition should resemble. For example, if a user desires a composition with a representation of a "woman" in a bottom-right location as a foreground object, including other object representations in a particular arrangement, then the user can select the respective icons from the tool bar and arrange them in the canvas as such.

The disclosed system also can learn an individual user's most commonly desired compositions and apply that filter to search results without any interaction required from the user in order to remove any burden from the user to indicate compositional arrangements. For example, if a user typically downloads images with a single headshot in the center, future queries from the user can either filter only for those images automatically or apply a weight factor so that images with that characteristic are promoted (or ranked higher) in the search results. The disclosed system may learn the user preferences by analyzing the selections made with respect to the compositional filters and similarly applying that preference to all search queries, regardless of whether the user has explicitly chosen a filter.

The disclosed system addresses a problem in the traditional IR systems, discovery of the most relevant images by composition, which is a problem specifically arising in the realm of computer technology, by providing a solution also rooted in computer technology, namely, by considering a search engine system using an object classifier for classifying salient objects in images using a salient map of the images and identifying these salient objects in image search results. The object classifier can classify the strength with which an image exhibits certain known objects and their locations within the image. The system may use an algorithm that detects the set of objects from a set of example images, referred to as training data. The disclosed system includes training of a series of computer-operated neural networks, such as a computer-operated convolutional neural network, to teach the neural network to identify features of images mapping to certain object classes for identifying those images that are responsive to an input search query with a probability that a region of an image is deemed salient. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, and then process those features against a number of object classes. The disclosed system produces a set of vectors representing the object classifications for the corpus of images in the training data. The objects are learned from running the convolutional neural network over a corpus of the training data. The trained convolutional neural network can provide a probability distribution where each data point in the distribution corresponds to likelihood that the image includes a corresponding object. In one or more implementations, the trained convolutional neural network provides a probability that a region of an image is salient. The disclosed system determines the probability that such training image contains a salient object based on probabilistic computations per object class for that training image. Once the convolutional neural network has been trained to predict probabilistically which features of the training images identify certain object classes, the disclosed system generates metadata for each example image indicating the salient object and its location within the image. In this respect, the disclosed system can then modify the original search results by incorporating items (e.g., thumbnails) that represent the salient objects for each original search result image.

The subject system provides several advantages including providing classified images that identify salient portions of the images. The system provides a machine learning capability where the system can learn from a content item and associated objects in order to refine search results with highly relevant content items. In this regard, the refined search results would yield content items with features that exploit the salient objects and their location within the images to facilitate the user's ability to filter through the search results. With this approach, the system can continually improve its accuracy (and keep up with trending differences of what certain salient objects look like) by incorporating user interaction data into its convolution-based salient map model. By presenting results to the user, identifying the media that a user interacts with (e.g., indicating which features among other features of an image received the most attention), and examining the results that a user ignores (e.g., indicating which features among other features of an image received the least attention), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which regions of the images are deemed salient. At runtime, the search query produces a search space that includes items representing salient regions of images based on a salient map of each subject image from original search results, thus reducing the cost of images provided for display (i.e., less bandwidth resources). Given that the subject system continues to learn and refine itself to match user preferences from a search query, modifying search results in real-time to emphasize the most salient region of each image in a listing of images reduces the system latency due to a lesser amount of time needed for a user to locate a desired search result image.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for clustering search results based on image composition suitable for practicing some implementations of the disclosure. The architecture 100 includes servers 130 and clients 110 connected over a network 150. One of the many servers 130 is configured to host a computer-operated neural network. The neural network, which can be a computer-operated convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient subjects. The servers 130 can return images tagged with metadata indicating one or more salient subjects and their locations within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Clustering System By Image Composition

Figure 2:
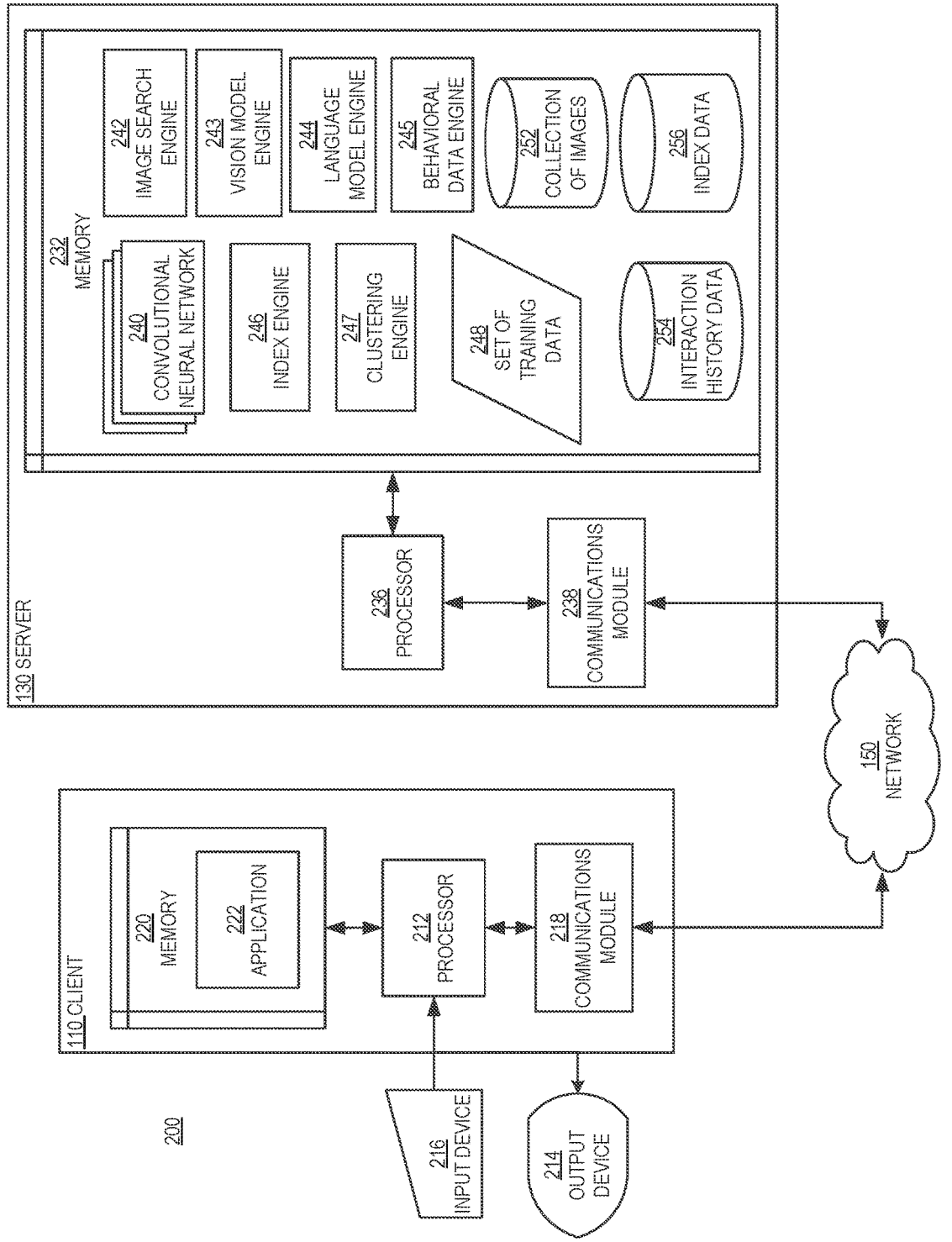
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a computer-operated convolutional neural network 240, an image search engine 242, a vision model engine 243, a behavioral data engine 245 and an index engine 246.

In one or more implementations, the convolutional neural network 240 may be a series of neural networks, one neural network for each object classification. As discussed herein, a computer-operated convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 may include more than one fully connected layer. The convolutional neural network 240 can include a loss layer (e.g., softmax or hinge loss layer) to back propagate errors so that the convolutional neural network 240 learns and adjusts its weights to better fit provided image data. The output of one of the fully connected layers may be fed into an output layer of the convolutional neural network 240, which may be configured to perform logistic regression that infers the probability of a region being salient.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. Each of the images may include an indication of one or more salient objects present in the image based on the corresponding object classes applicable to the image. The images may be paired with compositional vector information and image cluster information. In one or more implementations, the compositional vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. In one or more implementations, each input image may be decomposed into a set of non-overlapping regions, each of which may have uniform saliency values.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. The set of training data 248 may include multiple instances (or sets) of training data, where at least one instance (or set) of training data is associated with an intended object class. For example, the set of training data 248 may include images that include features that represent positive instances of a desired class so that the convolutional neural network 248 can be trained to distinguish between images with a feature of the desired class and images without a feature of the desired class. The set of training data 248 also may include compositional vector information and image cluster information. In one or more implementations, the compositional vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, salient object (or region) shown, and salient object (or region) selected. The behavioral data engine 245 may keep track of the frequency that a certain salient object or region is selected or which salient objects or regions are commonly selected.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on the salient objects or regions of the most-recent images downloaded or clicked by the user. For example, the processor 236 may determine that a user interacted with an image from a search result, such as, by clicking on a segment (or region) of the image identified as salient, saving the image for subsequent access, or downloaded the image to a client (e.g., client 110), or the like. The processor 236 may keep track of the user interactions with a number of images over a given time period. In one or more implementations, the processor 236 may track the learned salient objects or regions of the last N images that the user interacted with as well as a current user query, where N is a positive integer value. The interaction history 254 may also include data indicating search behavior (and/or patterns) relating to prior image search queries.

The vision model engine 243 may be a module executed by the processor 236 that is configured to identify the most salient and prominent objects in an image and their location within the image using the convolutional neural network 240. The vision model is trained to predict which query an image is more likely to belong to given the image. Based on the architecture of the vision model, the processor 236 may obtain localization from the image. The vision model can respond directly by indicating where are the mostly likely areas in an image that indicate where the query "man", for example, was located, and/or why the vision model indicated there was a representation of a "man" within the image. In one or more implementations, the processor 236 provides an example image to the vision model engine 243 such that the trained convolutional neural network 240 determines a saliency of each pixel in the example image with respect to an overall scene of the example image. In one or more implementations, the vision model engine 243 is configured to generate a saliency map of the example image using the trained convolutional neural network 240. For each pixel in the example image, the saliency map can provide how likely the pixel belongs to a salient object (or salient region).

The language model engine 244 may be a module executed by the processor 236 that is configured to predict an image and/or features of the image given an arbitrary input query. When training the neural language model to simulate or predict a class, the processor 236, using the language model engine 244, trains the neural language model that a class is a set of weights against those features that the deep learning model produced as part of the vision model, which is what the neural language model would learn. For a given class "woman", the trained neural language model returns the ten primary features that identify the class "woman", which corresponds to the features recognized by the vision model. The number of features returned may be an arbitrary number. In one or more implementations, the processor 236, using the language model engine 244, obtains raw outputs of the class weights from the vision model via the vision model engine 243. The processor 236, using the language model engine 244, feeds the raw class weights through the neural language model (e.g., the convolutional neural network 240) to generate a new set of class weights for that query (including queries not seen or trained against). In this respect, the neural language model with the new class weights attempts to learn how to map a query to the same manifold that the vision model learned.

The index engine 246 may be a module executed by the processor 236 that is configured to index an image collection (e.g., the collection of images 252). Indexing may involve a drastic dimensionality reduction, from a native dimensionality of about 2.5 k dimensions down to 256 dimensions to keep it attractive from a storage and search standpoint. In one or more implementations, the deep learning model implements a layer that takes an image of arbitrary aspect ratio and converts the image down to a fixed size grid, by averaging neighbor areas (e.g., 5×20 aspect ratio→5×4 size grid), hence resulting in an index of downsized images. In this respect, the compositional vectors of the grid for each image in the image collection are indexed.

The index data 256 may be a data structure including an array of entries, where each entry includes information relating to an image and the corresponding downsized image. For example, the index data 256 may include a vector representation of the downsized image as well as associated metadata indicating one or more image identifiers and/or keywords for the image. In one or more implementations, an index compression technique is applied to the index of images. If a single vector per image is stored, where each image includes a grid of decomposed cells (e.g., 8×8 grid), then the size of the index based on a vector per image being stored translates into a very large index. Instead of storing a vector for each cell in the grid, the processor 236, using the index engine 246, stores three vectors that describe a subspace within the image.

The clustering engine 247 may be a module executed by the processor 236 that is configured to generate search results clustered by composition. For example, the clustering engine 247 may cluster results in real-time based on compositional similarity. The clustering engine 247 may run a clustering algorithm, e.g., k-means, on all compositional vectors, for some relatively low value of k, e.g., k=5. The value of k may be an arbitrary value and may vary depending on implementation. The clustering engine 247 may cluster the images into a set of predefined compositional classes, e.g., subject left, subject middle, subject right, subject foreground, etc. The clustering engine 247 may be configured to define a distance function that takes a pair of vectors with each vector representing the image compositionally. In this respect, if two images have the same objects in approximately the same location, then the distance between the images should be relatively low (e.g., close to zero). On the other hand, if the image composition vectors have a different number of objects (e.g., one versus two objects) or the objects are different (e.g., a woman versus a man) or the objects are in different locations within the image, then the distance between the images should be relative larger.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

At runtime, given an arbitrary text query, the trained language model can construct a vector that matches the image that also is associated with that query. In this respect, the training data teaches the neural network how to learn the concept of an object, and how that maps to an image. The processor 236, using the image search engine 242, then takes a dot product of the vector that the neural language model generated across every image in the image collection (e.g., the index data 256).

The processor 236, using the image search engine 242 and the clustering engine 247, performs a ranking of the search results based on composition. In one or more implementations, the vector from the neural language model is compared to a compositional vector representing a search result image from the deep learning model. The comparison may determine that both vectors indicate a representation of a "woman", as well as where is the representation of the "woman" relative to the requested location (or spatial relation) from the input search query. For example, the processor 236, using the clustering engine 247, runs a k-means clustering algorithm on all the compositional vectors of the search results, where the query vector based on the user input indicates that the representation of the "woman" should be "on the left". The processor 236, using the clustering engine 247, presents results of a cluster that corresponds to a compositional class representing subjects "on the left". The image search engine 242 may issue a lower score to an image that has the subject aligned further from the left than if the image had the subject on the left within the image. Given the scores determined using the image search engine 242, the image search engine 242 could sort or rank the set of the images to produce a search result. The processor 236 may then provide the search result to the application 222 on the client 110 over the network 150 for display by an output device 214 of the client 110.

Figure 3A:
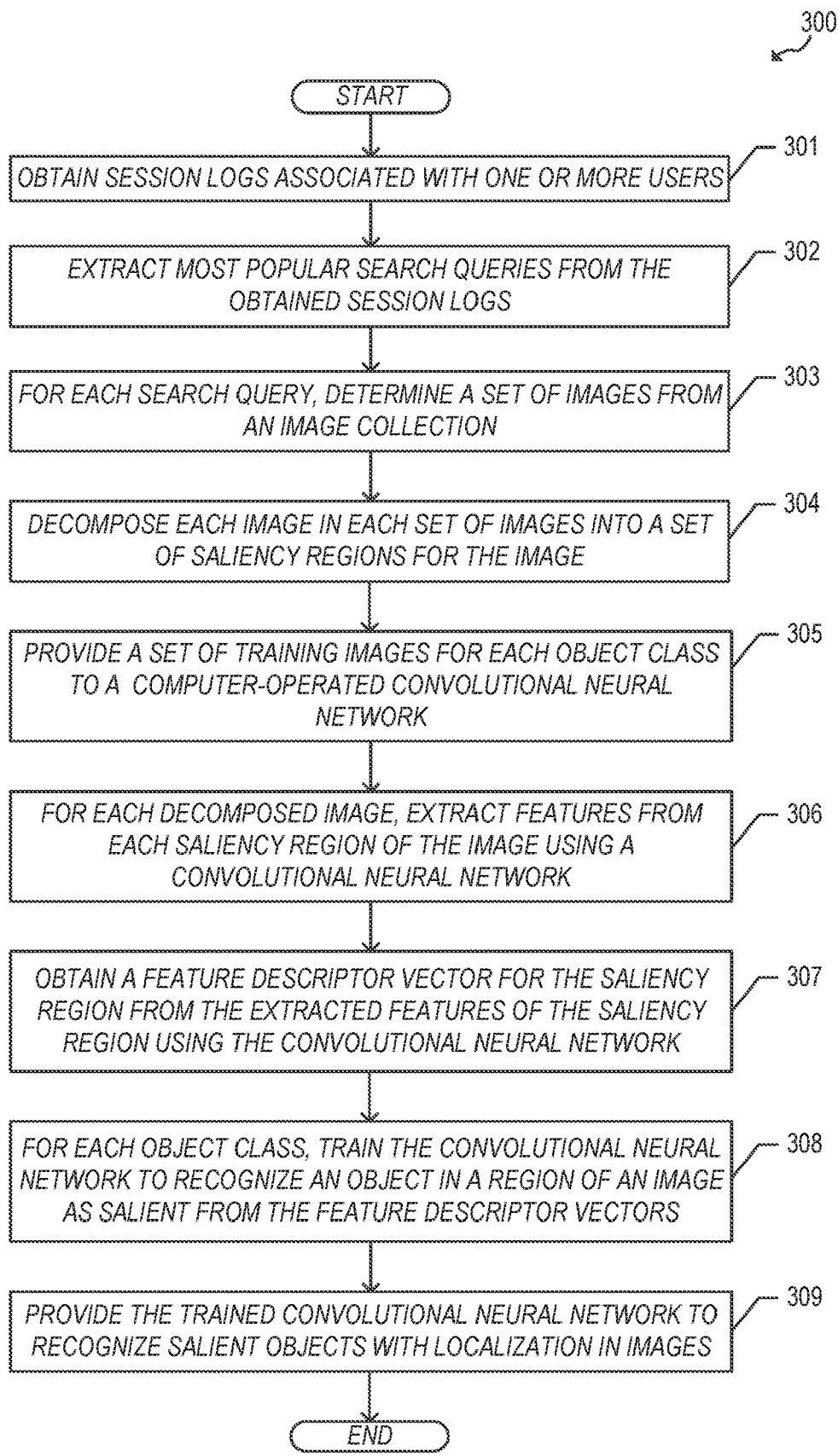
FIG. 3A illustrates an example offline process of training a computer-operated convolutional neural network for identification of composition with localization in an image using the example server of FIG. 2.

FIG. 3A illustrates an example offline process 300 of training a computer-operated convolutional neural network for identification of composition with localization in an image using the example server of FIG. 2. While FIG. 3A is described with reference to FIG. 2, it should be noted that the process steps of FIG. 3A may be performed by other systems. The process 300 begins by proceeding from start step to step 301 where the processor 236, using the behavioral data engine 245, obtains session logs associated with one or more users.

Subsequently, in step 302, the processor 236, using the behavioral data engine 245, extracts the most popular search queries from the obtained session logs. Next, in step 303, for each extracted search query, the processor 236, using the image search engine 242, determines a set of images from an image collection (e.g., 252). Subsequently, in step 304, each image in each set of images is decomposed into a set of saliency regions for the image.

Next, in step 305, a set of training data 248 (e.g., training images) for each object class is fed through a computer-operated convolutional neural network 240. For example, the convolutional neural network 240 can consist of a stack of six layers with weights, the first five layers being convolutional layers and the remaining layer being a fully-connected layer that serves as the classifier. The set of training data 248 can be fixed-size 242×242 pixel Black-White image data or Red-Green-Blue (RGB) image data. In one or more implementations, the set of training data 248 includes a data file containing pixel data for each training image. The set of training data 248 may include a different set of training images for each object class. For example, the set of training data 248 may include positive instances of a desired object class. The number of sets (or instances) of the training data included in the set of training data 248 may be an arbitrary number and may vary depending on implementation.

The convolutional neural network 240 may transform pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and an object classification by analyzing pixel data of the image. Training with the set of training data 248 may be regularized by weight decay, and the learning rate may initially be set to $10^{-2}$ and then decreased by a factor of 10 when validation set accuracy stops improving for the convolutional neural network 240. The feature extraction algorithm executed by the convolutional neural network 240 may be implemented with a single fully connected layer of the convolutional neural network 240 in some embodiments, or with three fully connected layers of the convolutional neural network 240 in other embodiments.

Subsequently, in step 306, for each decomposed image, features are extracted from each saliency region of the image using a computer-operated convolutional neural network (e.g., 240). In step 307, the convolutional neural network produces a feature descriptor vector for the saliency region from the extracted features of the saliency region.

Next in step 308, for each object class, the convolutional neural network 240 is trained to recognize an object in a region of an image as salient from the feature descriptor vectors. The convolutional neural network 240 may be trained to identify the most salient objects and their location within the image. The convolutional neural network 240 may be trained to first classify the image to a class. To compute the saliency of a region in the classified image, the convolutional neural network 240 may be trained to evaluate the contrast between the considered region (i.e., a region with a foreground object) and its surrounding area as well as the rest of the image (e.g., any background objects). Next in step 309, the trained convolutional neural network 240 is provided to recognize salient objects (or regions) with localization in images at runtime. The process to produce a vision model (or classifier) ends following step 309.

Figure 3B:
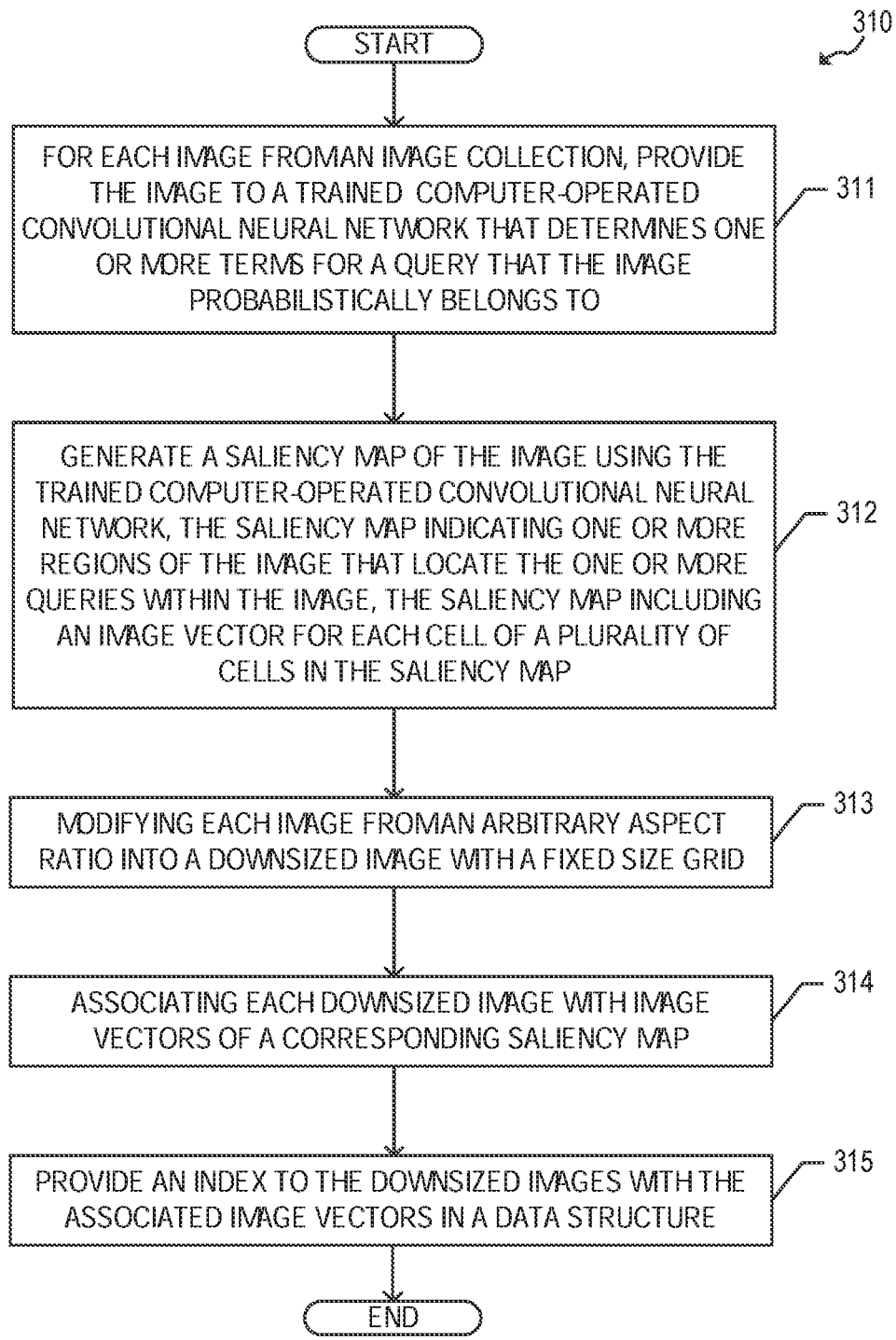
FIG. 3B illustrates an example offline process of constructing an index of images using the example server of FIG. 2.

FIG. 3B illustrates an example offline process 310 of constructing an index of images using the example server of FIG. 2. While FIG. 3B is described with reference to FIG. 2, it should be noted that the process steps of FIG. 3B may be performed by other systems. The process 310 begins by proceeding from start step to step 311 where for each image from the collection of images 252, the processor 236 feeds the image to a trained computer-operated convolutional neural network (e.g., vision model engine 244) to determine one or more terms for a query that the image probabilistically belongs to.

Next, in step 312, the processor 236, using the vision model engine 243, generates a saliency map of the image using the trained convolutional neural network 240. In one or more implementations, the saliency map indicates one or more regions of the image that locate the one or more queries within the image. In one or more implementations, the saliency map includes an compositional vector for each cell of a plurality of cells in the saliency map.

Subsequently, in step 313, the processor 236, using the index engine 246, modifies each image from an arbitrary aspect ratio into a downsized image with a fixed size grid. Next, in step 314, the processor 236, using the index engine 246, associates each downsized image with compositional vectors of a corresponding saliency map. In step 315, the processor 236, using the index engine 246, provides an index to the downsized images with the associated compositional vectors in a data structure (e.g., the index data repository 256).

Figure 3C:
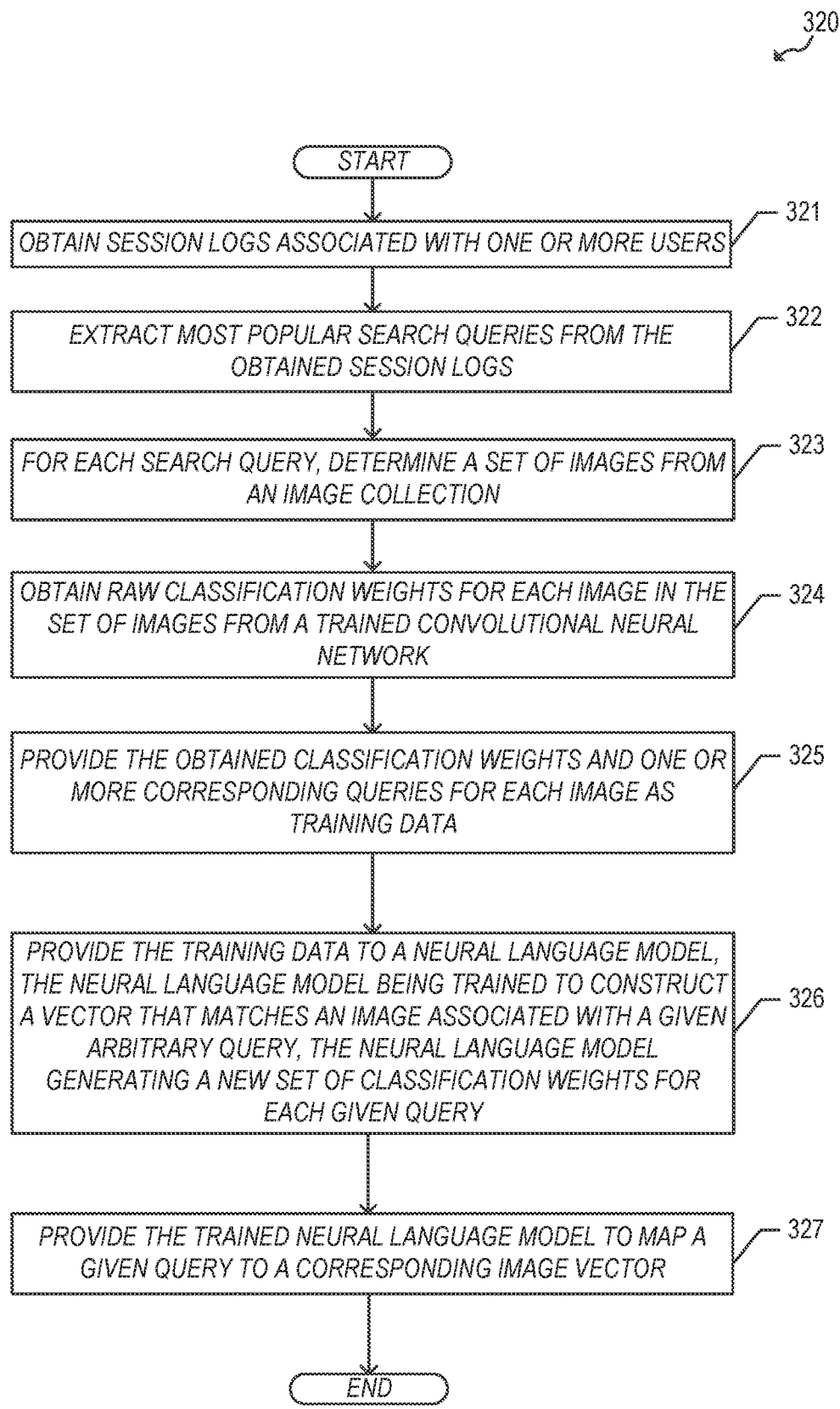
FIG. 3C illustrates an example offline process of training a computer-operated convolutional neural network for identification of an image given a query using the example server of FIG. 2.

FIG. 3C illustrates an example offline process 320 of training a computer-operated convolutional neural network for identification of an image given a query using the example server of FIG. 2. While FIG. 3C is described with reference to FIG. 2, it should be noted that the process steps of FIG. 3C may be performed by other systems. The process 320 begins by proceeding from start step to step 321 where the processor 236, using the behavioral data engine 245, obtains session logs associated with one or more users.

Next, in step 322, the processor 236, using the behavioral data engine 245, extracts the most popular search queries from the obtained session logs. Subsequently, in step 323, the processor 236, using the image search engine 242, determines a set of images from an image collection that is relevant to a corresponding extracted popular search query. Next, in step 324, for each set of images, the processor 236, using the language model engine 244, obtains raw classification weights for each image in the set of images from a trained vision model (e.g., the convolutional neural network 240 executed with the vision model engine 243).

Subsequently, in step 325, the processor 236, using the language model 244, provides the obtained classification weights and one or more corresponding queries for each image as training data. Next, in step 326, the processor 236, using the language model 244, provides the training data to a neural language model (e.g., the convolutional neural network 240 executed with the language model engine 244). In one or more implementations, the neural language model is trained to construct a vector that matches an image associated with a given arbitrary query. In one or more implementations, the neural language model generates a new set of classification weights for each given query. In step 327, the processor 236, using the language model engine 246, provides the trained neural language model to map a given query to a corresponding compositional vector.

Figure 3D:
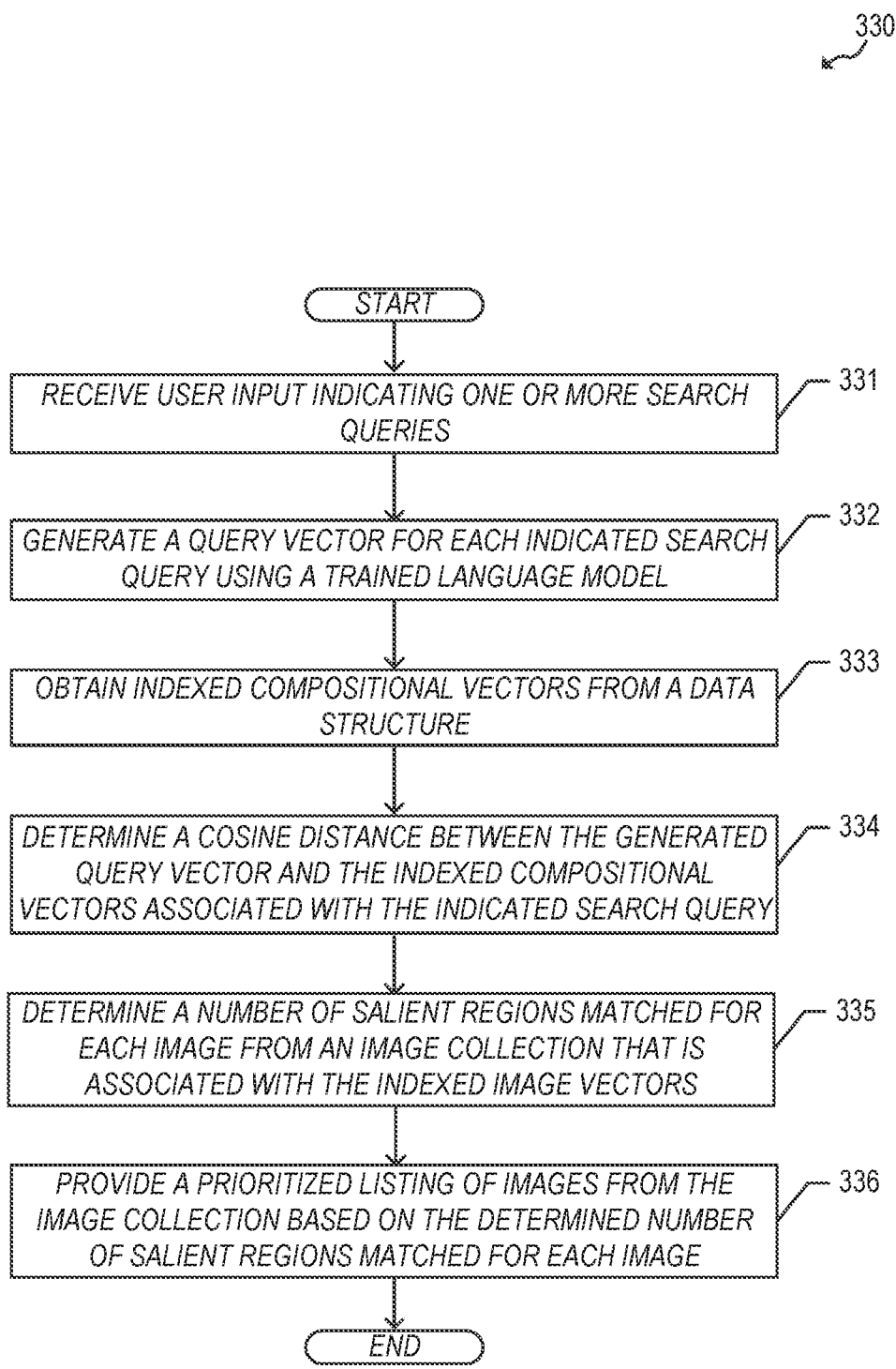
FIG. 3D illustrates an example runtime process of determining search results based on image composition the example server of FIG. 2.

FIG. 3D illustrates an example runtime process 330 of determining search results based on image composition the example server of FIG. 2. While FIG. 3D is described with reference to FIG. 2, it should be noted that the process steps of FIG. 3D may be performed by other systems.

The process 330 begins by proceeding from start step to step 331 where the image search engine 242 receives user input indicating one or more search queries. Next, in step 332, the processor 236, using the language model engine 244, generates a query vector for each indicated search query using a trained language model (e.g., the convolutional neural network 240). Subsequently, in step 333, the processor 236, using the index engine 246, obtains indexed compositional vectors from a data structure (e.g., index data 256). Next, in step 334, the processor 236, using the image search engine 242, determines a cosine distance between the generated query vector and the indexed compositional vectors associated with the indicated region.

Subsequently, in step 335, the processor 236, using the image search engine 242, determines a number of salient regions matched for each image from an image collection that is associated with the indexed compositional vectors. In step 336, the processor 236, using the image search engine 242, provides a prioritized listing of images from the image collection based on the determined number of salient regions matched for each image.

Figure 4:
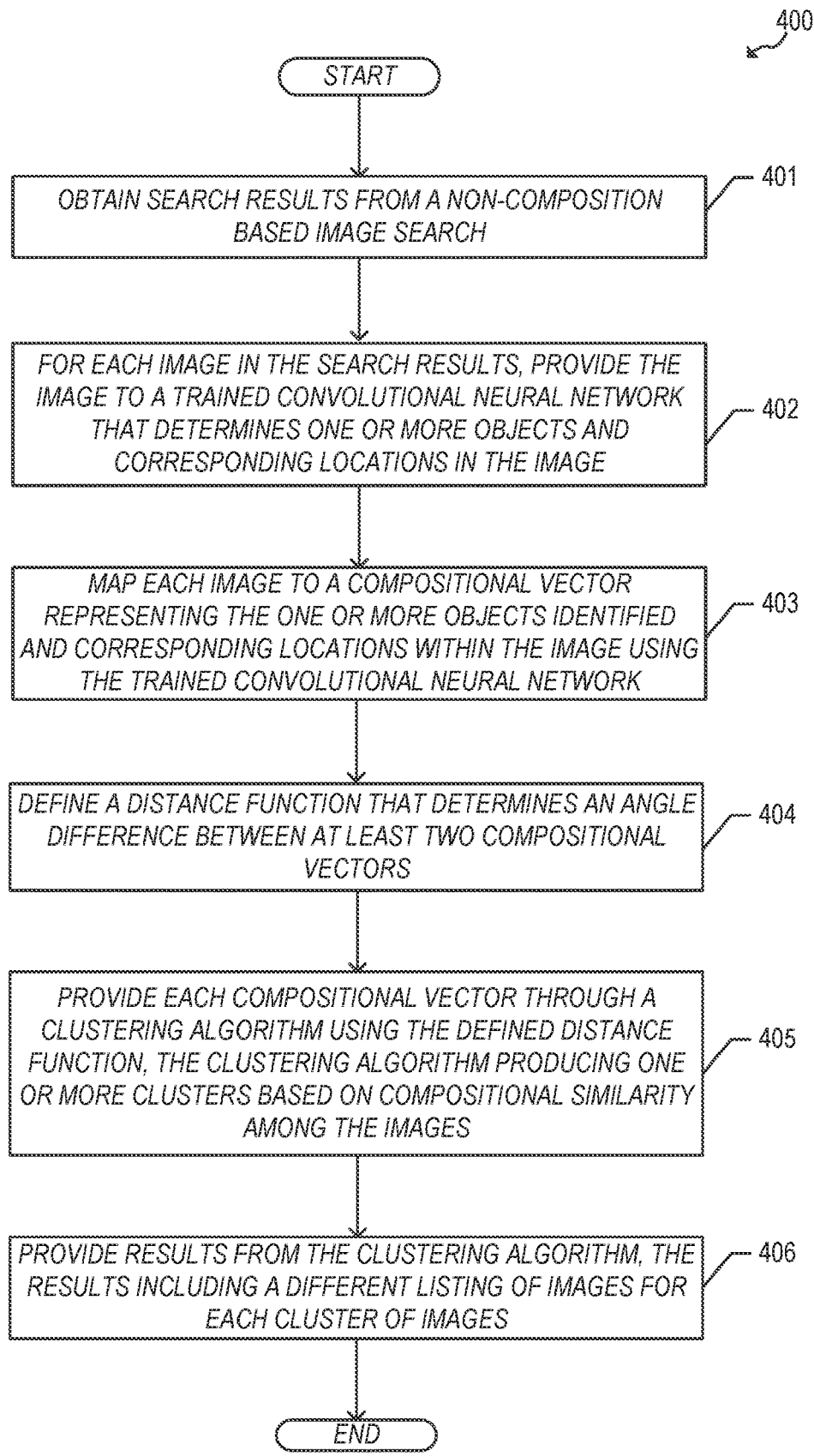
FIG. 4 illustrates an example runtime process of real-time clustering of search results based on image composition using the example server of FIG. 2.

FIG. 4 illustrates an example runtime process 400 of real-time clustering of search results based on image composition using the example server of FIG. 2. While FIG. 4 is described with reference to FIG. 2, it should be noted that the process steps of FIG. 4 may be performed by other systems. The process 400 begins by proceeding from start step to step 401 where the processor 236, using the image search engine 242, obtains search results from a non-composition based image search. In one or more implementations, the search results are responsive to an input search query.

Next, in step 402, for each image in the search results, the processor 236 provides the image to a trained computer-operated convolutional neural network 240 that determines one or more objects and corresponding locations in the image (e.g., the vision model 243). Subsequently, in step 403, the processor 236, using the vision model engine 243, maps each image to a compositional vector representing the one or more objects identified and corresponding locations within the image using the trained computer-operated convolutional neural network 240. For example, if object locations are represented as (x,y) coordinates in a M×N grid (e.g., 17×17 grid), and an image has a representation of a woman on the left and a representation of a man on the right, then a vector representation may be <woman, 5, 5, man, 10, 5>. Next, in step 404, the processor 236, using the clustering engine 247, defines a distance function that determines a cosine angle difference between at least two compositional vectors. Other distance functions may be used depending on implementation.

In one or more implementations, the distance function includes a cosine distance, where the cosine distance between the vectors indicates the angle between the two subjects and/or corresponding locations within the image. If the cosine distance is minimized (i.e., the angle is minimized), then the similarity of the two concepts is maximized. In this respect, if their angle is minimized, then the visual concept of the "woman" appearing on the left and the query concept of the "woman, left" are very likely the same.

In one or more implementations, a threshold is applied to the clustering algorithm to reduce the set of images in the clustering. For example, the threshold may indicate a cosine distance threshold, where the image is not kept or considered for the clustering when the cosine distance is negative or exceeds the cosine distance threshold. In another aspect, the image is not kept for the clustering when the cosine angle difference between the vectors is greater than a predetermined angle (e.g., 90 degrees).

Subsequently, in step 405, the processor 236, using the clustering engine 247, provides each compositional vector through a clustering algorithm (e.g., k-means) using the defined distance function. In one or more implementations, the clustering algorithm produces one or more clusters based on compositional similarity among the images. In step 406, the processor 236, using the image search engine 242 and the clustering engine 247, provides results from the clustering algorithm. In one or more implementations, the results include a different listing of images for each cluster of images.

Figure 5A:
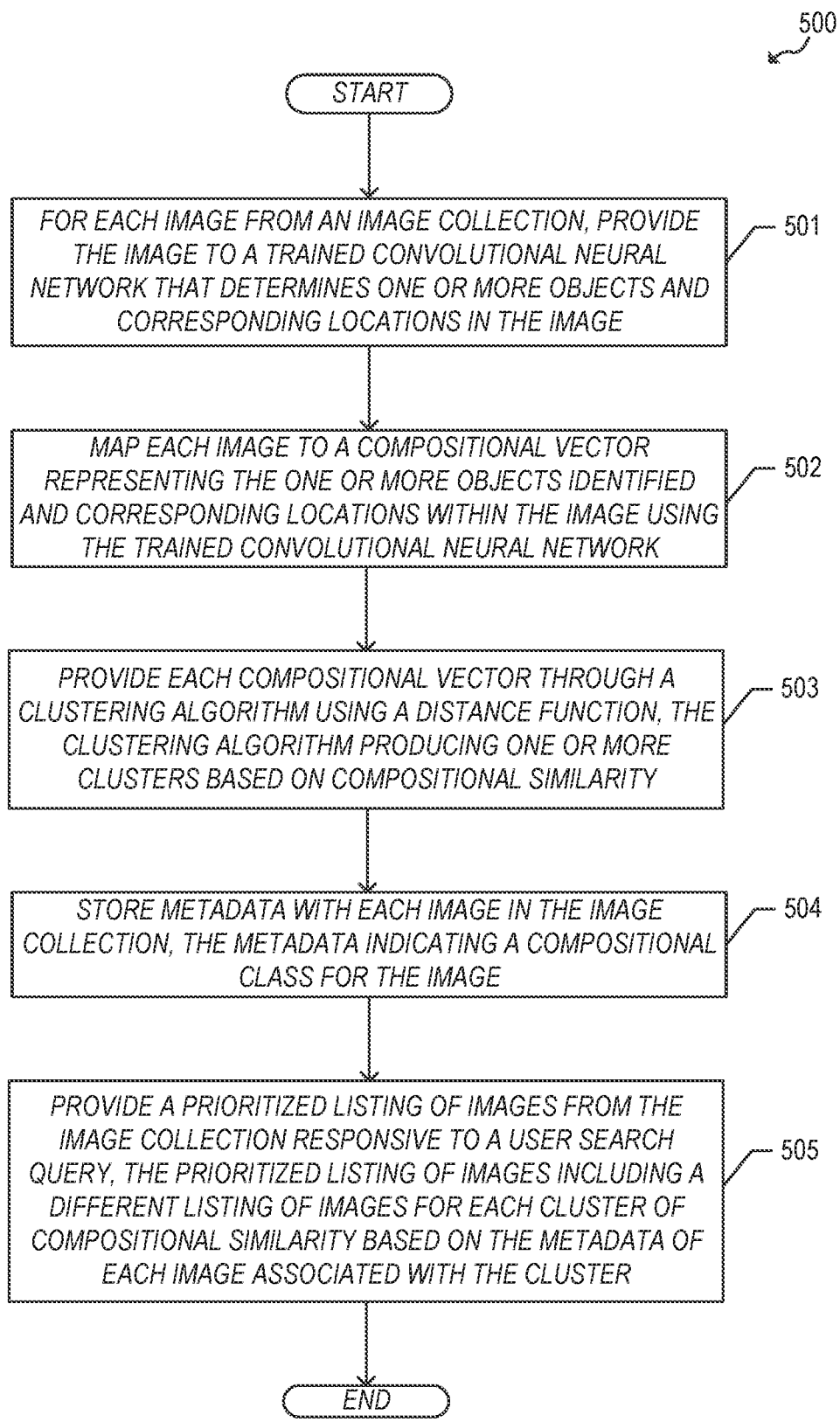
FIG. 5A illustrates an example offline process of clustering an image collection based on image composition using the example server of FIG. 2.

FIG. 5A illustrates an example offline process of clustering an image collection based on image composition using the example server of FIG. 2. While FIG. 5A is described with reference to FIG. 2, it should be noted that the process steps of FIG. 5A may be performed by other systems. The process 500 begins by proceeding from start step to step 501 where for each image from an image collection, the processor 236 provides the image a trained computer-operated convolutional neural network 240 that determines one or more objects and corresponding locations in the image.

Next, in step 502, the processor 236, using the vision model engine 243, maps each image to a compositional vector that represents the one or more objects identified and corresponding locations within the image using the trained computer-operated convolutional neural network 240. Subsequently, in step 503, the processor 236, using the clustering engine 247, provides each compositional vector through a clustering algorithm using a distance function. In one or more implementations, clustering algorithm produces one or more clusters based on compositional similarity. The clustering engine 247 may cluster all the images using k-means into a set number of clusters such as k=10 clusters based on compositional similarity. This may discover the best manner to group the images in the image collection compositionally from the data. Next, in step 504, the processor 236, using the index engine 246, stores metadata with each image in the image collection. In one or more implementations, the metadata indicates a compositional class for the image. For example, the metadata may indicate a compositional class as "compositional_class_2" or as "subject_left".

In step 505, the processor 236, using the image search engine 242, provides a prioritized listing of images from the image collection that is responsive to a input search query. In one or more implementations, the prioritized listing of images includes a different listing of images for each cluster of compositional similarity based on the metadata of each image associated with the cluster. For example, each group (or cluster) of images may be presented as a separate row of results, where three rows may represent subjects on the left, centered and on the right.

Figure 5B:
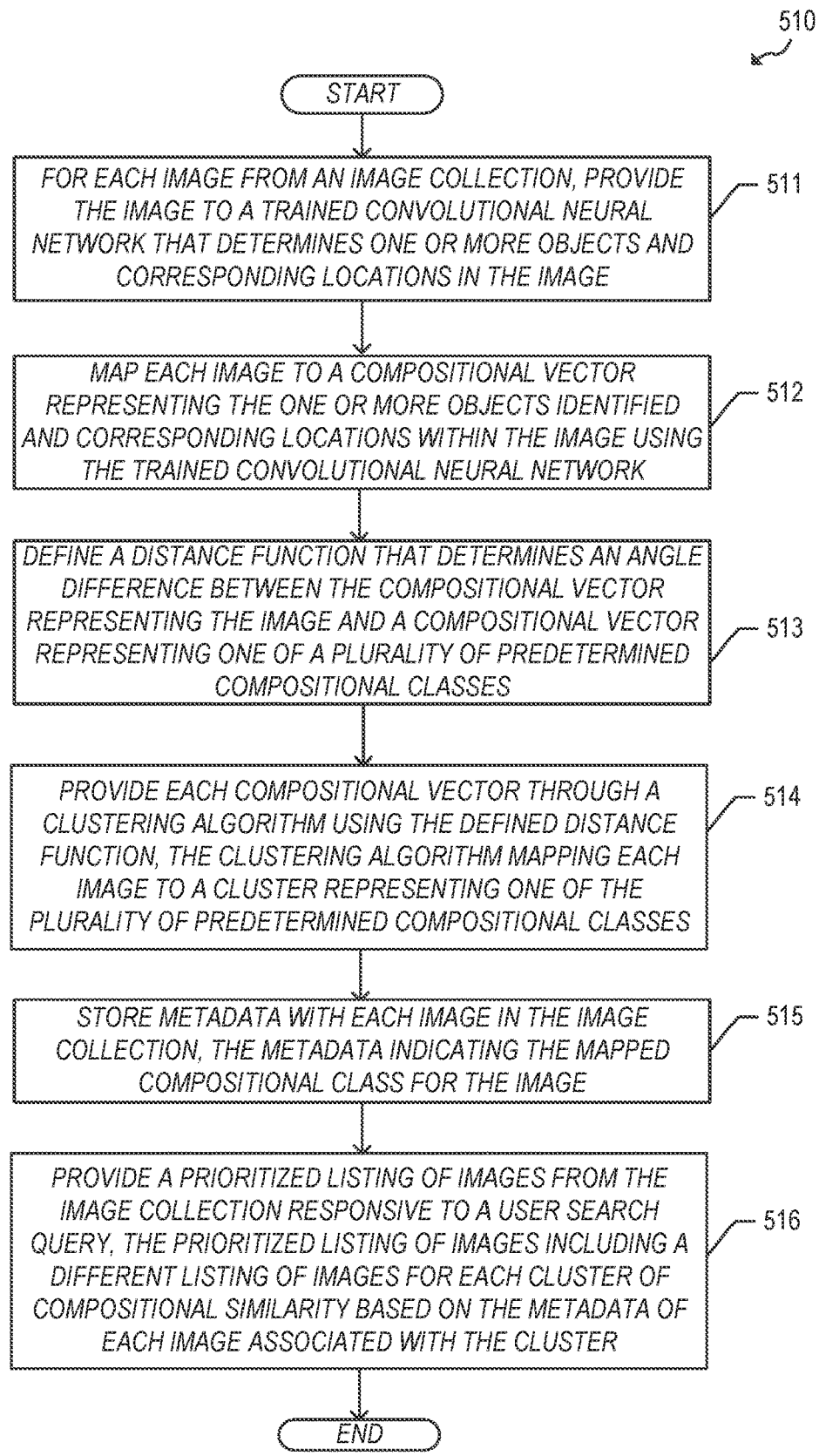
FIG. 5B illustrates an example offline process of clustering an image collection into a predetermined number of compositional classes based on image composition using the example server of FIG. 2.

FIG. 5B illustrates an example offline process 510 of clustering an image collection into a predetermined number of compositional classes based on image composition using the example server of FIG. 2. While FIG. 5B is described with reference to FIG. 2, it should be noted that the process steps of FIG. 5B may be performed by other systems. The process 510 begins by proceeding from start step to step 511 where for each image from an image collection, the processor 236 provides the image a trained computer-operated convolutional neural network 240 that determines one or more objects and corresponding locations in the image.

Next, in step 512, the processor 236, using the vision model engine 243, maps each image to a compositional vector that represents the one or more objects identified and corresponding locations within the image using the trained computer-operated convolutional neural network 240. Subsequently, in step 513, the processor 236, using the clustering engine 247, defines a distance function that determines a cosine angle difference between the compositional vector representing the image and a compositional vector representing one of a plurality of predetermined compositional classes. Next, in step 514, the processor 236, using the clustering engine 247, provides each compositional vector through a clustering algorithm using the defined distance function. In one or more implementations, the clustering algorithm maps each image to a cluster representing one of the plurality of predetermined compositional classes.

Subsequently, in step 515, the processor 236, using the index engine 246, stores metadata with each image in the image. In one or more implementations, the metadata indicates the mapped compositional class for the image. In step 516, the processor 236, using the image search engine 242, provides a prioritized listing of images from the image collection that is responsive to a input search query. In one or more implementations, the prioritized listing of images includes a different listing of images for each cluster of compositional similarity based on the metadata of each image associated with the cluster.

Figure 6A:
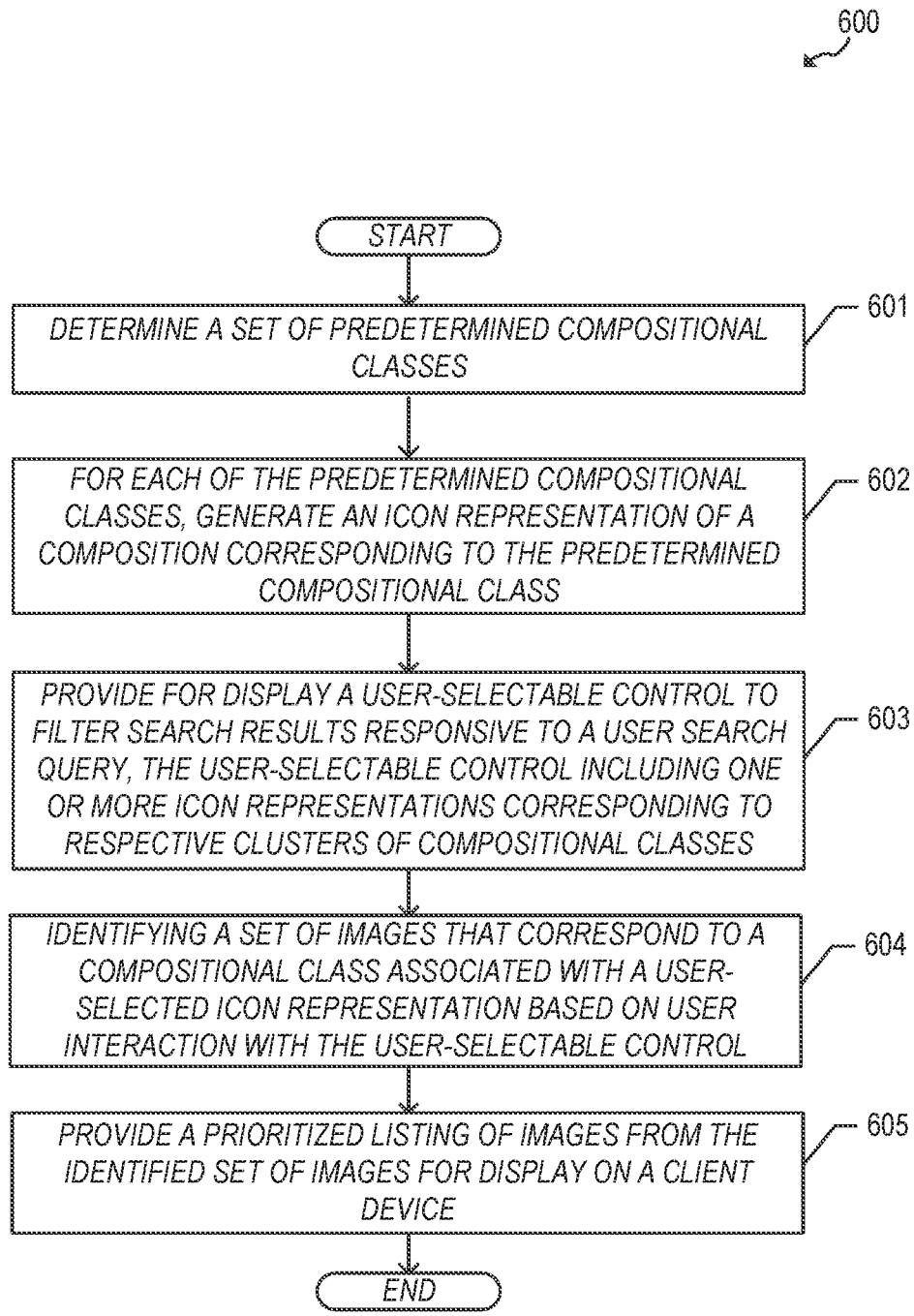
FIG. 6A illustrates an example process of generating a predetermined set of image compositions as filter options for filtering search results based on image composition using the example server of FIG. 2.

FIG. 6A illustrates an example process 600 of generating a predetermined set of image compositions as filter options for filtering search results based on image composition using the example server of FIG. 2. While FIG. 6A is described with reference to FIG. 2, it should be noted that the process steps of FIG. 6A may be performed by other systems. The process 600 begins by proceeding from start step to step 601 where the processor 236, using the visional model engine 243 and the clustering engine 247, determines a set of predetermined compositional classes. Next, in step 602, for each of the predetermined compositional classes, the processor 236, using the vision model engine 243 and clustering engine 247, generates an icon representation of a composition corresponding to the predetermined compositional class. For example, a user interface may include a grid with head shot and body shot on one axis and subject centered left, middle and right on the other axis. This would allow for six potential choices of compositions. These may or may not represent what a user is most interested in but would be logical choices available to the user.

Subsequently, in step 603, the processor 236, using the image search engine 242, provides for display a user-selectable control to filter search results responsive to a input search query. In one or more implementations, the user-selectable control includes one or more icon representations corresponding to respective clusters of compositional classes. Next, in step 604, the processor 236, using the clustering engine 247 and the image search engine 242, identifies a set of images that correspond to a compositional class associated with a user-selected icon representation based on user interaction with the user-selectable control. In step 605, the processor 236, using the image search engine 242, provides a prioritized listing of images from the identified set of images for display on the client 110.

Figure 6B:
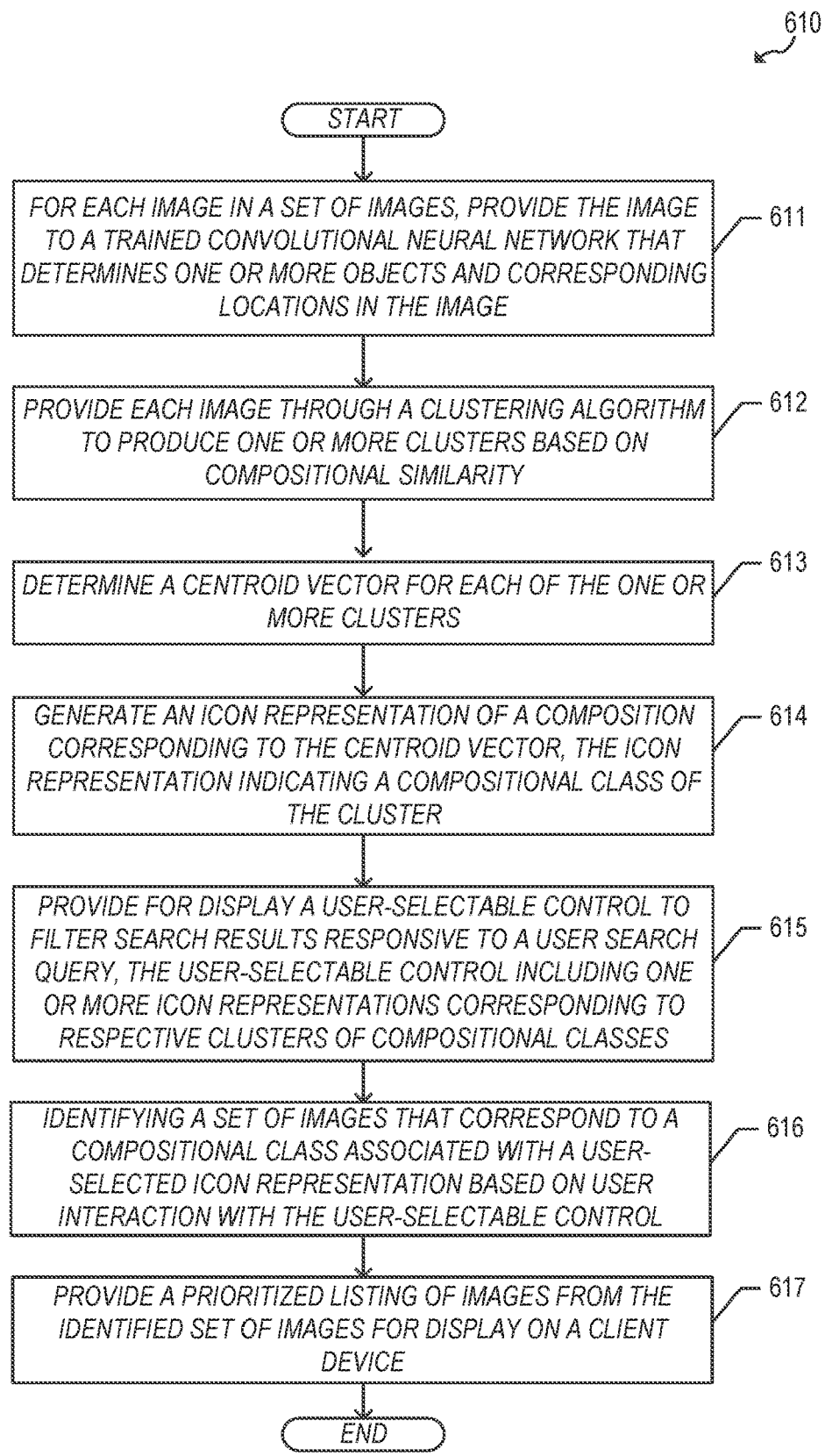
FIG. 6B illustrates an example process of generating a set of common image compositions as filter options for filtering search results based on image composition using the example server of FIG. 2.

FIG. 6B illustrates an example process 610 of generating a set of common image compositions as filter options for filtering search results based on image composition using the example server of FIG. 2. While FIG. 6B is described with reference to FIG. 2, it should be noted that the process steps of FIG. 6B may be performed by other systems. The process 610 begins by proceeding from start step to step 611 where for each image in a set of images, the processor 236, provides the image to a trained computer-operated convolutional neural network 240 that determines one or more objects and corresponding locations in the image.

Next, in step 612, the processor 236, using the clustering engine 247, provides each image through a clustering algorithm to produce one or more clusters based on compositional similarity. Subsequently, in step 613, the processor 236, using the clustering engine 247, determines a centroid vector for each of the one or more clusters. In one or more implementations, the centroid vector represents an average (or mean) of compositional vectors associated with the cluster. Next, in step 614, the processor 236, using the image search engine 242 and the clustering engine 247, generates an icon representation of a composition corresponding to the centroid vector. In one or more implementations, the icon representation indicates a compositional class of the cluster. In one or more implementations, the processor 236, using the clustering engine 247, generates the icon representation of each cluster by analyzing images closest to the centroid vector of each cluster and then representing the composition elements that are common among the images. In one or more implementations, the processor 236, using the clustering engine 247, generates the icon representation of each cluster by using behavioral data to determine the most frequently downloaded images, for example. In this respect, the clustering algorithm focuses on the most popular images. In one or more implementations, the behavioral data is applied to clustered images to identify a subset of clusters for generating the icon representation from that subset.

Subsequently, in step 615, the processor 236, using the image search engine 242 and the clustering engine 247, provides for display a user-selectable control to filter search results responsive to a input search query. In one or more implementations, the user-selectable control including the one or more icon representations corresponding to respective clusters of compositional classes. Next, in step 616, the processor 236, using the image search engine 242, identifies a set of images that correspond to a compositional class associated with a user-selected icon representation based on user interaction with the user-selectable control. In step 617, the processor 236, using the image search engine 242, provides a prioritized listing of images form the identified set of images for display on the client 110.

Figure 7:
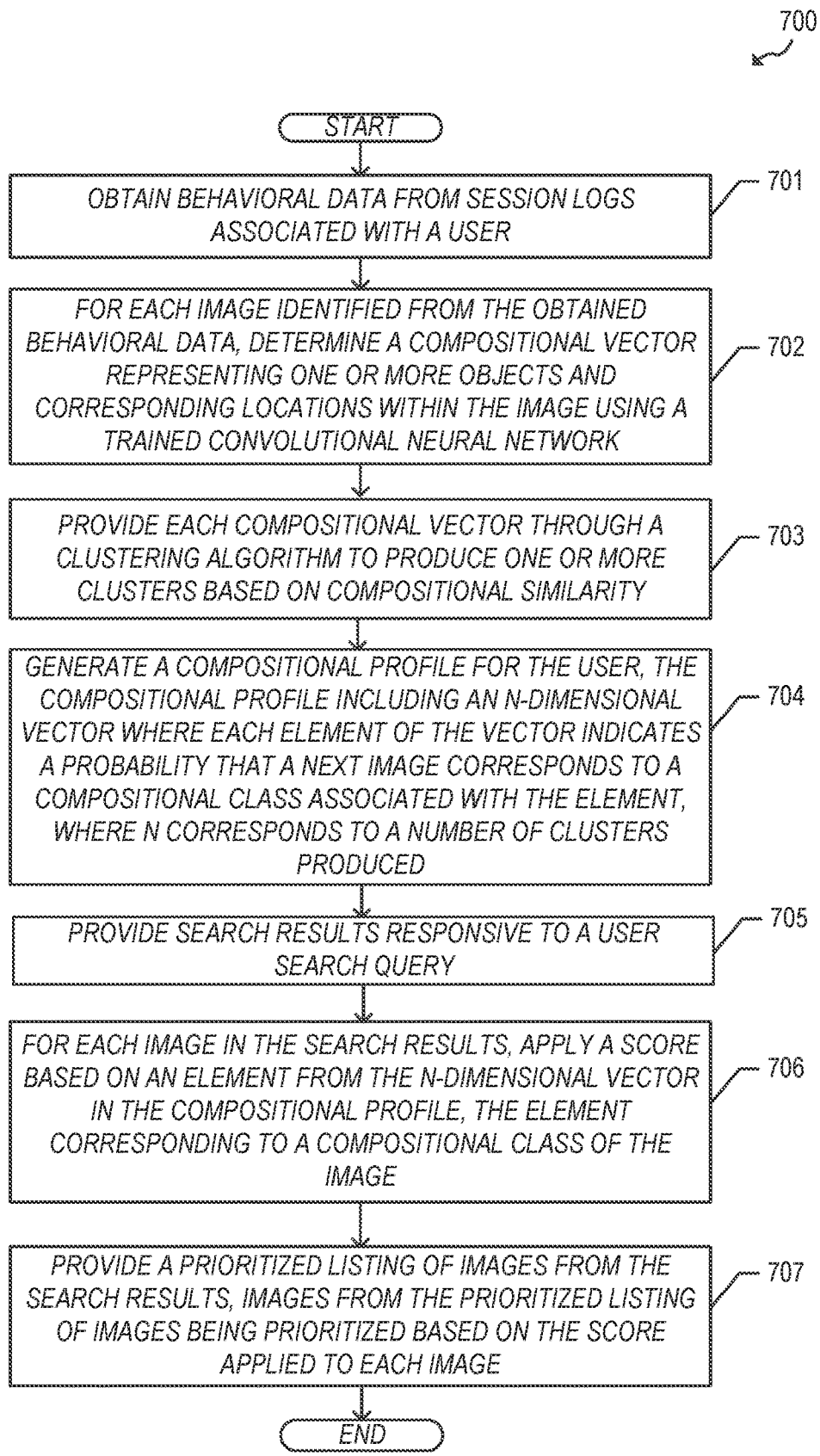
FIG. 7 illustrates an example process of applying personalized compositional preferences to search results using the example server of FIG. 2.

FIG. 7 illustrates an example process 700 of applying personalized compositional preferences to search results using the example server of FIG. 2. While FIG. 7 is described with reference to FIG. 2, it should be noted that the process steps of FIG. 7 may be performed by other systems. The process 700 begins by proceeding from start step to step 701 where the processor 236, using the behavioral data engine 245, obtains behavioral data from session logs associated with a user.

Next, in step 702, for each image identified from the obtained behavioral data, the processor 236, using the vision model engine 243, determines a compositional vector representing one or more objects and corresponding locations within the image using the trained computer-operated convolutional neural network 240. Subsequently, in step 703, the processor 236, using the clustering engine 247, provides each compositional vector through a clustering algorithm to produce one or more clusters based on compositional similarity.

Next, in step 704, the processor 236, using the vision model engine 243, generates a compositional profile for the user. In one or more implementations, the compositional profile includes an N-dimensional vector, where each element of the vector indicates a probability that a next image corresponds to a compositional class associated with the element, where N corresponds to a number of clusters produced. For example, if the collection is assigned to have k=10 clusters, then the user compositional preferences would be represented by a 10-dimensional vector (e.g., <0.1, 0, 0, 0, 0.2, 0.3, 0, 0, 0, 0.4>). The value of each element in the N-dimensional vector is arbitrary and may vary depending on implementation.

Subsequently, in step 705, the processor 236, using the image search engine 242, provides search results responsive to a input search query. Next, in step 706, for each image in the search results, the processor 236, using the image search engine 242, applies a score based on an element from the N-dimensional vector in the compositional profile of the user. In one or more implementations, the element corresponds to a compositional class of the image. The score may be expressed as score=score*(1+x), where x is the element in the user compositional profile. In this respect, if the image is from the first compositional class, then the score applied would be about 1.1 since the first compositional class in the vector has a probability of 0.1 for the user. In step 707, the processor 236, using the image search engine 242, provides a prioritized listing of images from the search results. In one or more implementations, images from the prioritized listing of images are prioritized based on the score applied to each image.

Figure 8:
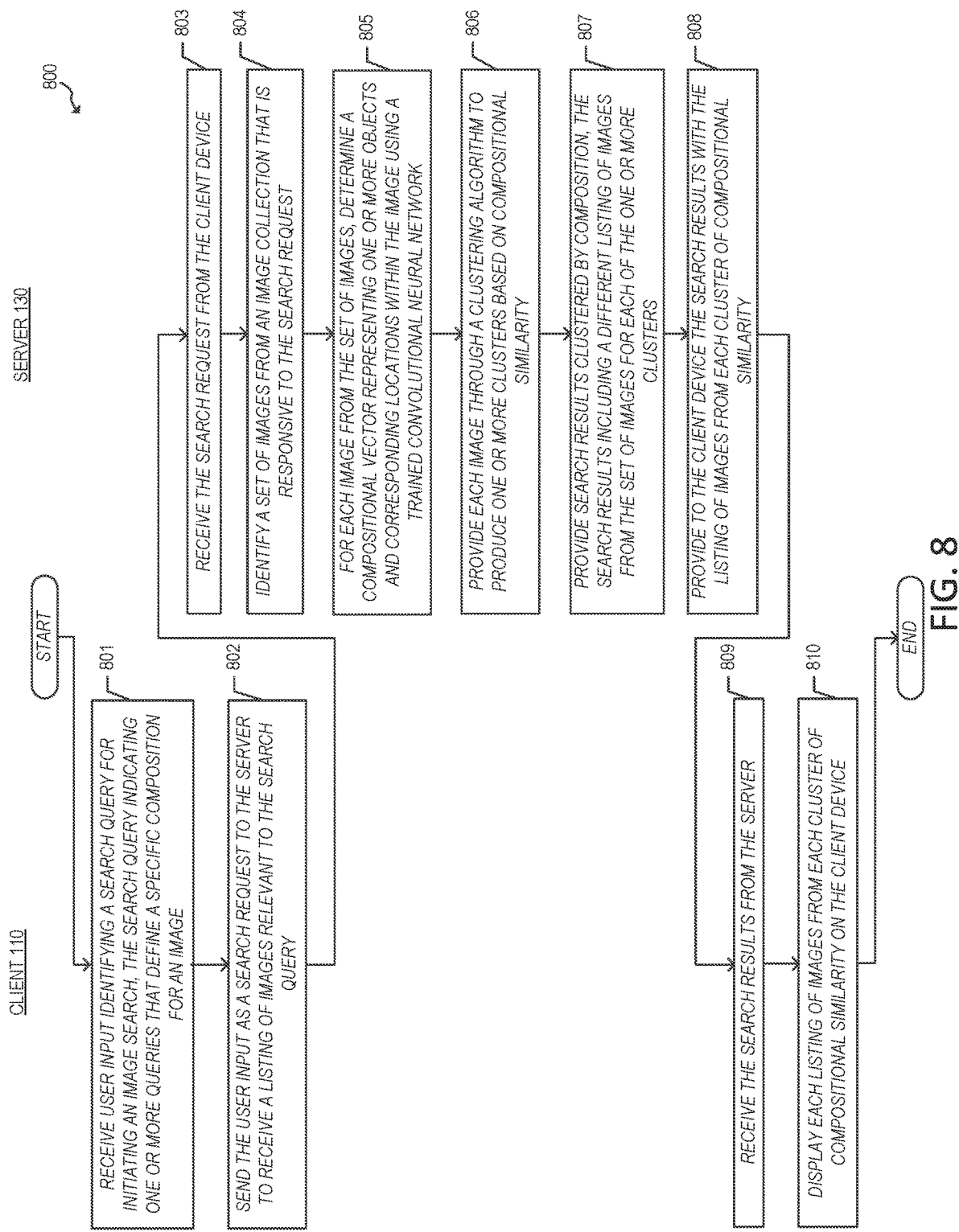
FIG. 8 illustrates an example process for clustering search results based on image composition using the example client and server of FIG. 2.

FIG. 8 illustrates an example process for clustering search results based on image composition using the example client and server of FIG. 2. The process 800 begins in step 801 when a user, for example, loads an application 222 on a client 110 and the client 110 receives an input from the user using the input device 216 for a search query to initiate an image search through the collection of images 252.

The input identifies one or more search queries in a given natural language for initiating the image search. In one or more implementations, the search query indicates one or more queries that define a specific composition for an image. In one or more implementations, the input includes location information indicating a spatial relationship between two or more queries at one or more regions of a search input page of the application 222. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms and localization of such terms as part of a text-based search query via a user interface of the application 222.

Next, in step 802, the application 222 on the client 110 sends the user input as a search request to the server 130 in order to receive a listing of images responsive to the text-based search query. Turning to the server 130, in step 803, the server 130 receives the search request for a listing of images from the client 110. Subsequently, in step 804, the server 130 identifies a set of images from an image collection that is responsive to the received search request.

Next, in step 805, for each image from the identified set of images, the server 130 determines a compositional vector representing one or more objects and corresponding locations within the image using a trained computer-operated convolutional neural network 240. Subsequently, in step 806, the server 130 provides each image through a clustering algorithm to produce one or more clusters based on compositional similarity. Next, in step 807, the server 130 provides search results clustered by composition. In one or more implementations, the search results include a different listing of images from the set of images for each of the one or more clusters.

In step 808, the server 130 provides to the client 110 the search results with the listing of images from each cluster of compositional similarity. Turning back to the client 110, in step 809, the client 110 receives the search results from the server 130. Next, in step 810, each listing of images from each cluster of compositional similarity is provided for display via the application 222 of the client 110.

Figure 9:
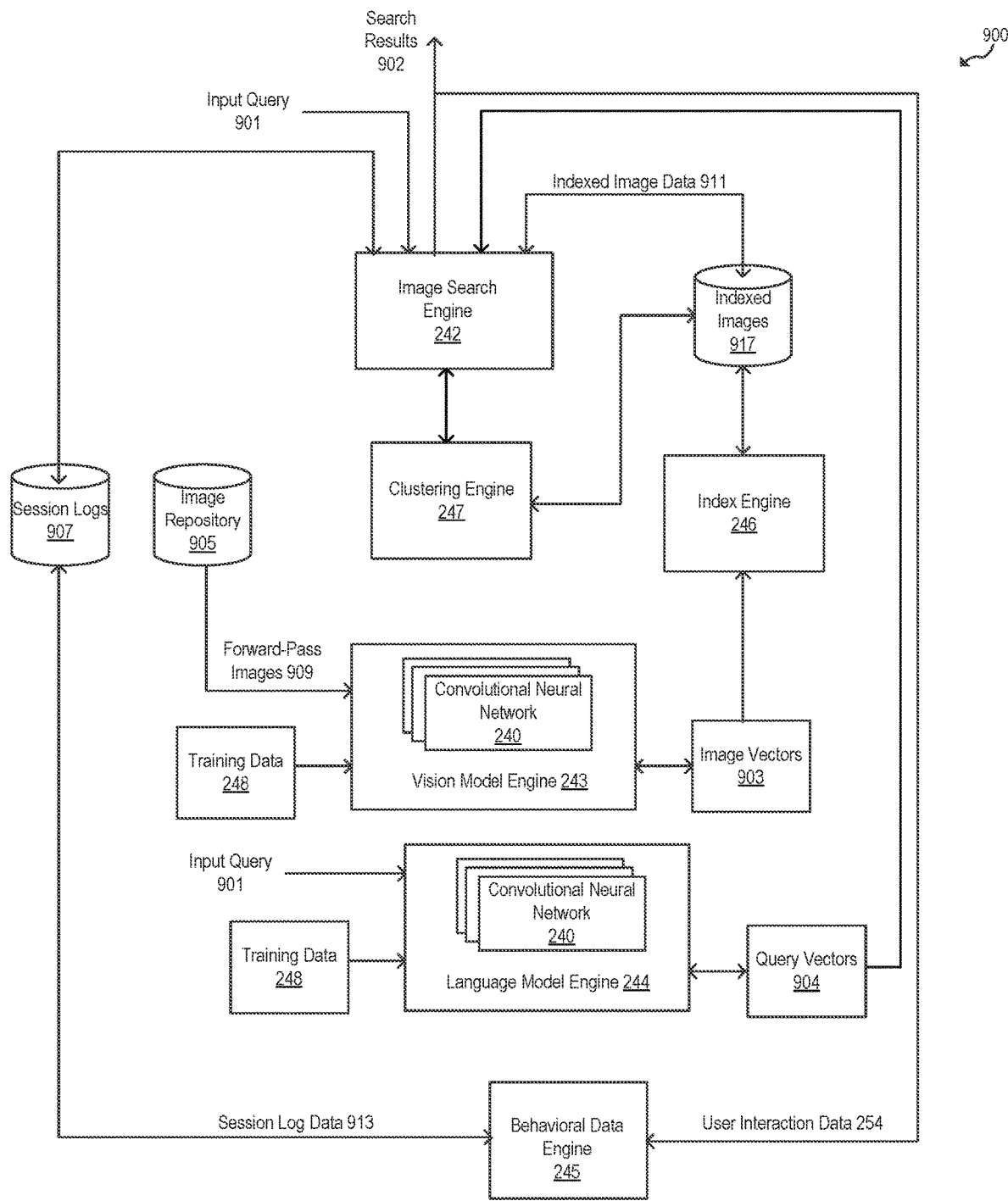
FIG. 9 illustrates a schematic diagram of an example architecture suitable for practicing the example process of FIGS. 3A-3D and 7.

FIG. 9 illustrates a schematic diagram 900 of an example architecture suitable for practicing the example processes of FIGS. 3A-3D, 4, 5A-5B, 6 and 7. In FIG. 9, the architecture 900 provides for an input search query to search for and retrieve a set of images that map, or at least in part, to a specific composition indicated by the input search query.

In one or more implementations, the processor 236, using the vision model engine 243, trains the convolutional neural network 240 that learns how to map an image to one of a predetermined number of queries (e.g., 6600 top queries). In some aspects, a certain subset of queries may be popular, e.g., abstract, background, man, woman smile type queries. In one or more implementations, the processor 236, using the image search engine 242, obtains a set of images for each query from the image repository 905 using the forward-pass images 909.

In one or more implementations, the processor 236, using the vision model engine 243, trains a deep learning model (e.g., the convolutional neural network 240) using the training data 248, where the deep learning model is trained to predict which query an image is more likely to belong to given the image.

As a result, based on the architecture of the deep learning model, the processor 236 may obtain localization from the image. The deep learning model can respond directly by indicating where are the mostly likely areas in an image that indicate where the query "man", for example, was located, and/or why the deep learning model indicated there was a representation of a "man" within the image.

The processor 236 can use the trained deep learning model to index an image collection (e.g., the collection of images 252). Indexing may involve a drastic dimensionality reduction, from a native dimensionality of about 2.5 k dimensions down to 256 dimensions to keep it attractive from a storage and search standpoint. In one or more implementations, the deep learning model implements a layer that takes an image of arbitrary aspect ratio and converts the image down to a fixed size grid, by averaging neighbor areas (e.g., 5×20 aspect ratio→5×4 size grid), hence resulting in an index of downsized images (e.g., 917). In this respect, the compositional vectors of the grid (e.g., 903) for each image in the image collection are indexed.

In one or more implementations, the processor 236, using the language model engine 244, trains a neural language model (e.g., the convolutional neural network 240) with the training data 248 that includes, for example, the top 1 million queries. The number of queries for training the neural language model can be an arbitrary number.

In one or more implementations, the processor 236, using the language model engine 244, obtains raw outputs of the class weights from the vision model via the vision model engine 243. The processor 236, using the language model engine 244, feeds the raw class weights through the neural language model (e.g., the convolutional neural network 240) to generate a new set of class weights for that query (including queries not seen or trained against). In this respect, the neural language model with the new class weights attempts to learn how to map a query to the same manifold that the vision model learned.

The neural language model simulates the classification weights, whereas a traditional multinomial classifier feeds the learned classification weights as output to a softmax layer to produce a probability distribution over the classes. In the traditional multinomial classifier, each class weight is represented as a vector. In this respect, if the number of features that the classifier produces is 2.5 k, then each class has 2.5 k weights. The traditional multinomial classifier applies those weights to all the features of an image, and then sums the weights together (i.e., a dot product) for all the classes, and runs the dot product through the softmax layer.

When a user submits a query, the processor 236, using the index engine 246, can index all of the language queries to have the set of vectors for caching, or use the neural language model to generate the language queries on-the-fly. In FIG. 9, the processor 236, using the neural language model generates a new set of weights every time for every query. In one or more implementations, if the neural language model generates vectors for the same query twice, it will be the same vector because the neural language model is deterministic. In one or more implementations, the processor 236, using the behavioral data engine 245, mines session logs using the session log data 913 to determine a number of predetermined icons, and prepopulates a user interface of the application 222 at the client 110 with a listing of predetermined query icons that a user can select and submit as a language query as part of the user interaction data 254.

When the processor 236, using the vision model engine 243, is harvesting features from the deep neural network (e.g., the convolutional neural network 240), the deep neural network is giving back a set of features in a saliency map, where each dimension is a feature of an image and floating point value for that feature. When training the neural language model to simulate or predict a class, the processor 236, using the language model engine 244, trains the neural language model that a class is a set of weights against those features that the deep learning model produced as part of the vision model, which is what the neural language model would learn. For a given class "woman", the trained neural language model returns the ten primary features that identify the class "woman", which corresponds to the features recognized by the vision model.

At runtime, given an arbitrary text query (e.g., 901), the trained language model can construct a vector that matches the image that also is associated with that query. In this respect, the training data teaches the neural network how to learn the concept of an object, and how that maps to an image. The processor 236, using the image search engine 242, then takes a dot product of the vector that the neural language model generated across every image in the image collection.

In one or more implementations, the processor 236, using the clustering engine 247, automatically clusters all images into compositionally similar groups. For example, the clustering engine 247 may cluster search results (e.g., 902) into three compositional classes: subject on the left, subject centered, or subject on the right. In one or more implementations, the clustering engine 247, clusters images from the search results 902 into an arbitrary number of clusters. Visually, the user may be presented with results from each cluster in a separate row so the user can then focus only on the composition that interests them. In one or more implementations, the processor 236, using the clustering engine 247, determines the clusters based on offline processing, where each image is tagged with a compositional tag (e.g. "subject_left"). In one or more implementations, the processor 236, using the clustering engine 247, determines the clusters in a post-processing stage after the search results 902 for the input query 901 are generated ignoring composition (i.e., a non-composition based image search). In this case, the clustering engine 247 runs a clustering algorithm (e.g., k-means) only on the relevant results and may produce different clusters than in the offline case since the image set would be reduced in size and may not have images in certain compositional arrangements.

In one or more implementations, the processor 236, using the clustering engine 247 and the image search engine 242, generates compositional search filters for display with the search results 902. A compositional filter may be presented that allows a user to select from a grid of compositional options, e.g., head or body shot on one axis and left, center, or right on another axis. For example, if the user interaction data 254 indicates that a user selects "head shot, left" via the compositional filter and the input query 901 includes a query for "woman", then the processor 236, using the image search engine 242, keeps images showing a representation of "women" head shots appearing on the left, hence filtering out all other images from the search results 902.

In one or more implementations, the processor 236, using the behavior data engine 245, mines the session logs 907 to obtain behavioral data from the session log data 913 in order to restrict the filter options to only a predetermined number of commonly desired compositional arrangements. For example, if analyzing the most commonly downloaded images for the query "group people" reveals that a composition with three people is common, with two people in the foreground and one in the background, then the processor 236, using the image search engine 242, may provide an additional compositional filter to allow the user to select this filter and receive a listing of images with the selected composition in the search results 902.

In one or more implementations, the processor 236, using the behavioral data engine 245, mines the session logs 907 to obtain behavioral data from the session log data 913 in order to learn the most commonly desired compositions of a user, thereby removing any burden from the user to indicate compositional arrangements. For example, the user interaction data 254 may indicate that a user typically downloads images with a single headshot in the center, which may be stored as session log data 913 in the session logs 907. The processor 236, using the image search engine 242, applies that filter to the search results 902 without any interaction required from the user. In this respect, future queries from the user via the input query 901 can either filter only for those images automatically or apply a boost so that images with that characteristic are promoted in the search results. In one or more implementations, the processor 236, using the image search engine 242, may apply a weight to modify the ranking of images containing more relevant characteristics (e.g., a desired composition). In one or more implementations, the processor 236, using the behavioral data 245, analyzes user selections with respect to compositional filters from the user interaction data 254 in order to learn user preferences of image compositions. In this respect, the processor 236, using the clustering engine 247, applies the learned user preferences to all initiated image searches, regardless of whether the user has explicitly chosen a filter.

Figure 10:
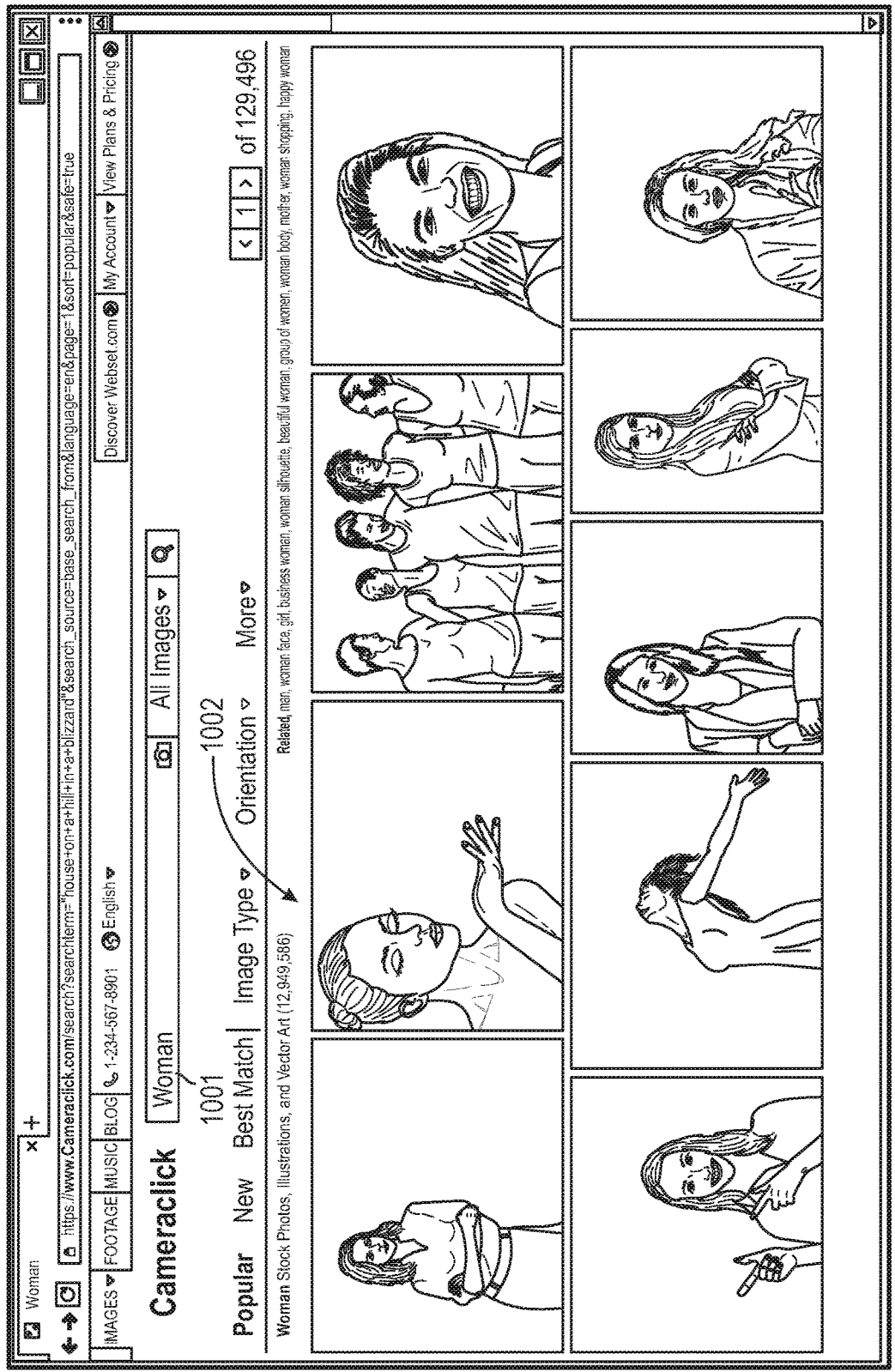
FIG. 10 illustrates an example of a user interface for practicing the example process of FIGS. 3A through 3D.

FIG. 10 illustrates an example of a user interface 1000 for practicing the example processes of FIGS. 3A, 3B and 8 via the application 222 of the client 110. FIG. 10 also provides an example illustration of a prioritized listing of images 1002 displayed in the user interface 1000 responsive to the input search query 1001. In some aspects, the image search may be initiated using different natural languages (e.g., Spanish, French, German, etc.) other than English depending on implementation. In FIG. 10, the user interface 1000 of the application 222 includes an input section for receiving a input search query 1001 and an output section for displaying a listing of images 1002 responsive to the input search query. In FIG. 1000, the listing of images 1002 are displayed in a mosaic-based layout but the listing of images 1002 may be in a different layout depending on implementation. The listing of images 1002 may include a predetermined layout set by the image search service or by user preferences depending on implementation. In one or more implementations, the layout may be adjusted in real-time based on user interaction with the layout. The listing of images 1002 may include images corresponding to a search term and/or phrase in the input search query 1001. The image search query 708 includes the term "woman," and therefore, the image search returned the listing of images 1002 that includes images having representations of women captured in different locations within the images.

Figure 11:
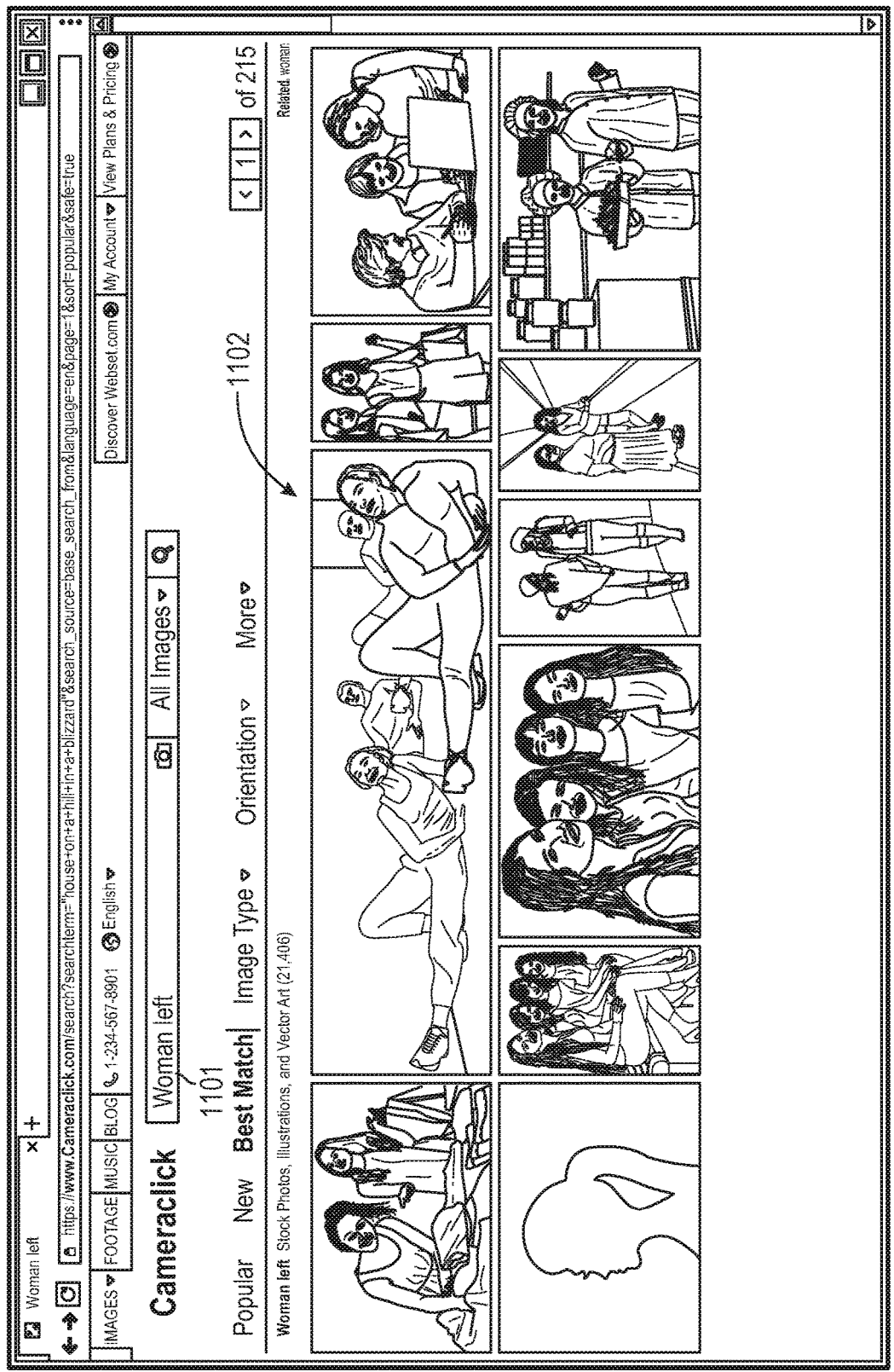
FIG. 11 illustrates an example of a user interface for practicing the example process of FIG. 4.

FIG. 11 illustrates an example of a user interface 1100 for practicing the example process of FIG. 4 via the application 222 of the client 110. In one or more implementations, the user interface 1100 includes an input search query 1101 that indicates a query term (e.g., woman left). The processor 236, using the image search engine 242, feeds the cells with the supplied query terms through the trained neural language model (e.g., 240, 244), and obtains a vector for the representation of "woman left". The processor 236, using the image search engine 242 and the index engine 246, compares each vector to an indexed grid by scoring each cell for the object representation. In one or more implementations, the trained neural language model can produce a heat map of the object representation for each image of where the object representation may be located within the image. The processor 236, using the clustering engine 247, presents search results clustered by compositional similarity based on where the user indicated the representation of the "woman" should be located within the composition of an image. The image search engine 242 then returns a search result 1103 that may include one or more images with a specific composition that is relevant to the composition indicated by the input search query 1101. In FIG. 11, the search result includes images where the representation of the "woman" is on the left.

Figure 12:
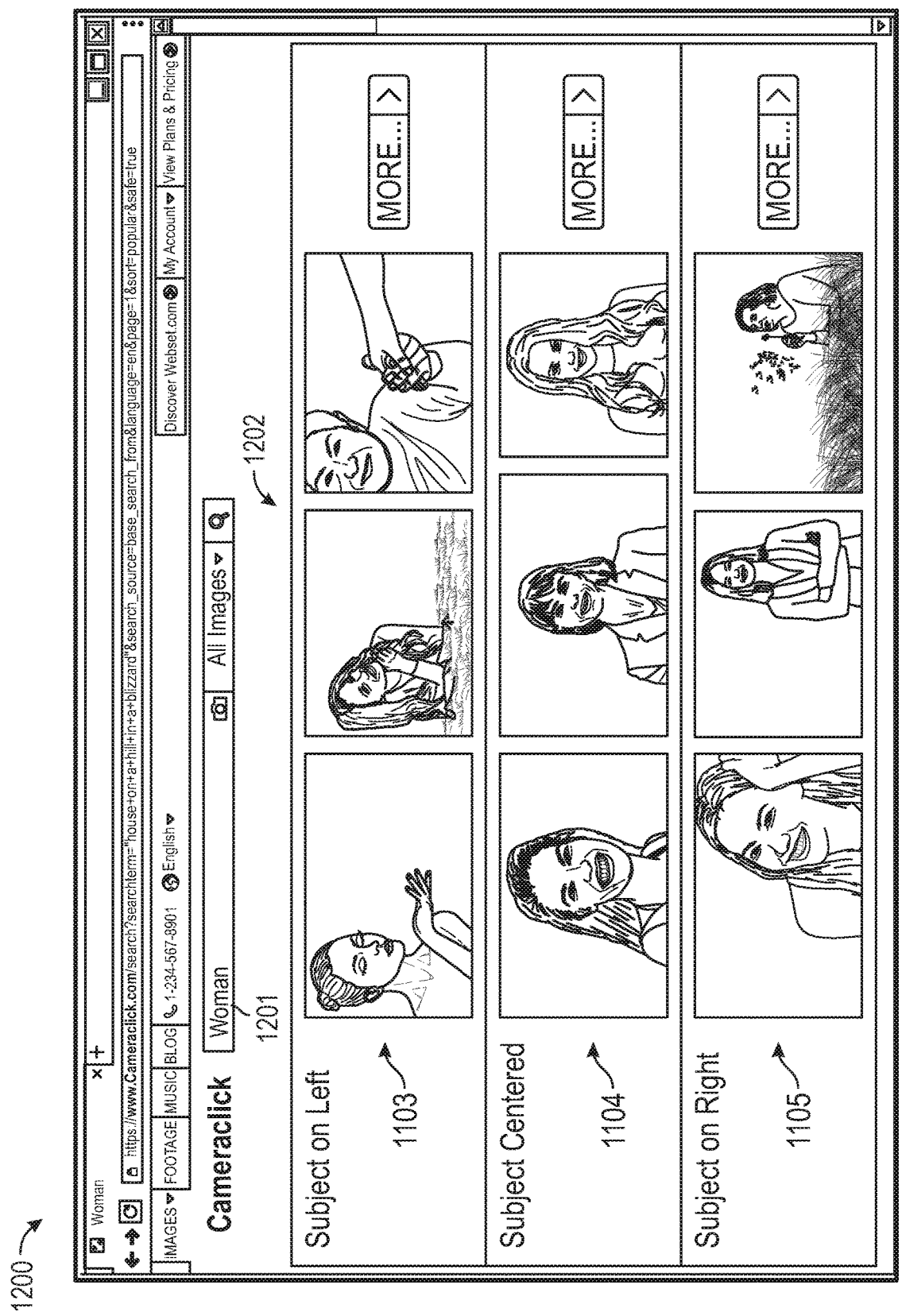
FIG. 12 illustrates an example of a user interface for practicing the example process of FIGS. 5A and 5B.

FIG. 12 illustrates an example of a user interface 1200 for practicing the example process of FIGS. 5A and 5B via the application 222 of the client 110. In one or more implementations, the user interface 1200 includes an input search query 1201 that indicates a query term (e.g., woman left). The processor 236, using the image search engine 242, feeds the cells with the supplied query terms through the trained neural language model (e.g., 240, 244), and obtains a vector for the representation of "woman". The processor 236, using the image search engine 242 and the index engine 246, compares each vector to an indexed grid by scoring each cell for the object representation. In one or more implementations, the trained neural language model can produce a heat map of the object representation for each image of where the object representation may be located within the image. The processor 236, using the clustering engine 247, presents search results clustered by compositional similarity based on where the user indicated the representation of the "woman" should be located within the composition of an image. The image search engine 242 then returns a search result 1203 that may include one or more images with a specific composition that is relevant to the composition indicated by the input search query 1201. In FIG. 12, the search result 1203 includes a prioritized listing of images with different listing of images for each cluster of compositional similarity based on the metadata of each image associated with the cluster. For example, each group (or cluster) of images may be presented as a separate row of results, where three rows may represent subjects on the left (e.g., 1203), centered (e.g., 1204) and on the right (e.g., 1205).

Figure 13:
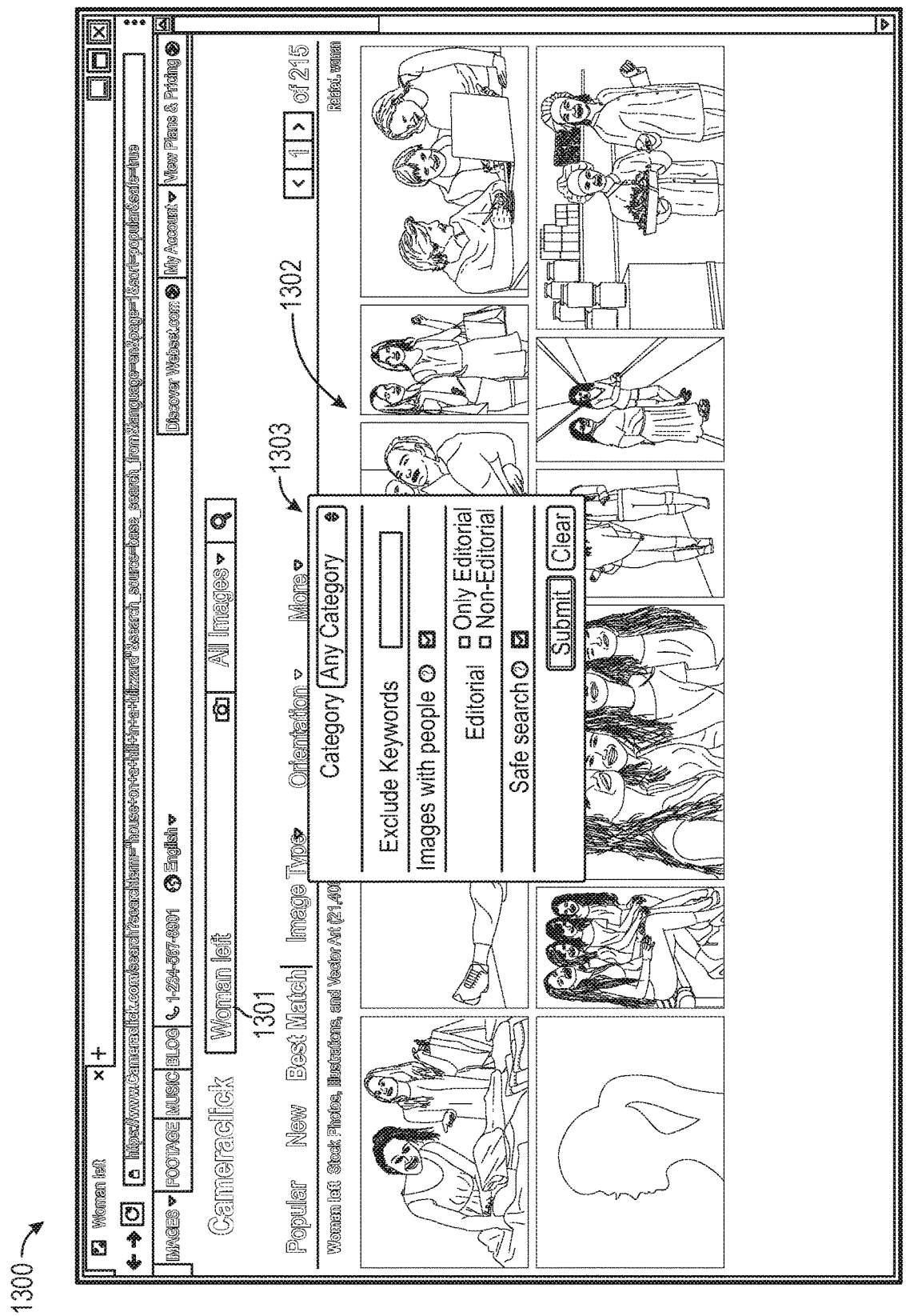
FIG. 13 illustrates an example of a user interface for practicing the example process of FIG. 6B.

FIG. 13 illustrates an example of a user interface 1300 for practicing the example process of FIG. 6B via the application 222 of the client 110. In one or more implementations, the user interface 1300 includes an input search query 1301 that indicates a query term (e.g., woman left). The image search engine 242 then returns a search result 1302 that may include one or more images with a specific composition that is relevant to the composition indicated by the input search query 1301. In FIG. 13, the search results returned include images where the representation of the "woman" is on the left.

The user interface 1300 presents compositional search filters for visually supporting the user in identifying images with a certain composition. A compositional filter 1303 is presented that allows the user to select from a grid of compositional options, e.g. head or body shot on one axis and left, center, or right on another axis. If the user selects "head shot, left" and queries for "woman", then only images having a representation of women headshots appearing on the left would be presented, filtering out all other images.

Figure 14A:
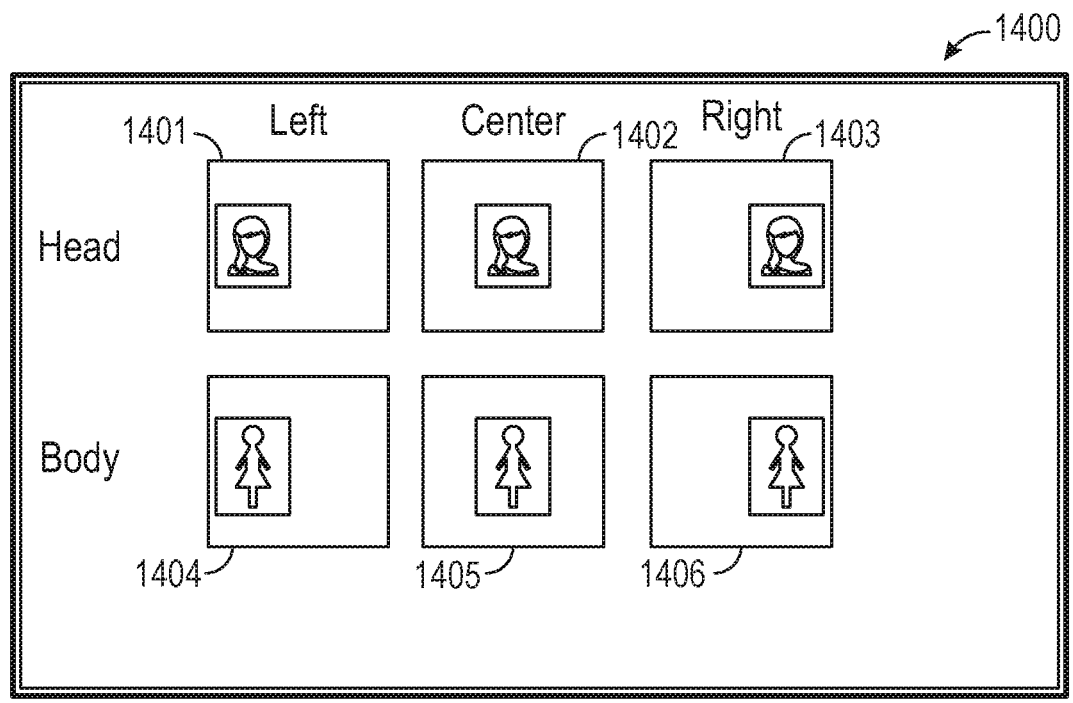
FIGS. 14A and 14B illustrate examples of a user interface for practicing the example process of FIG. 6A.
Figure 14B:
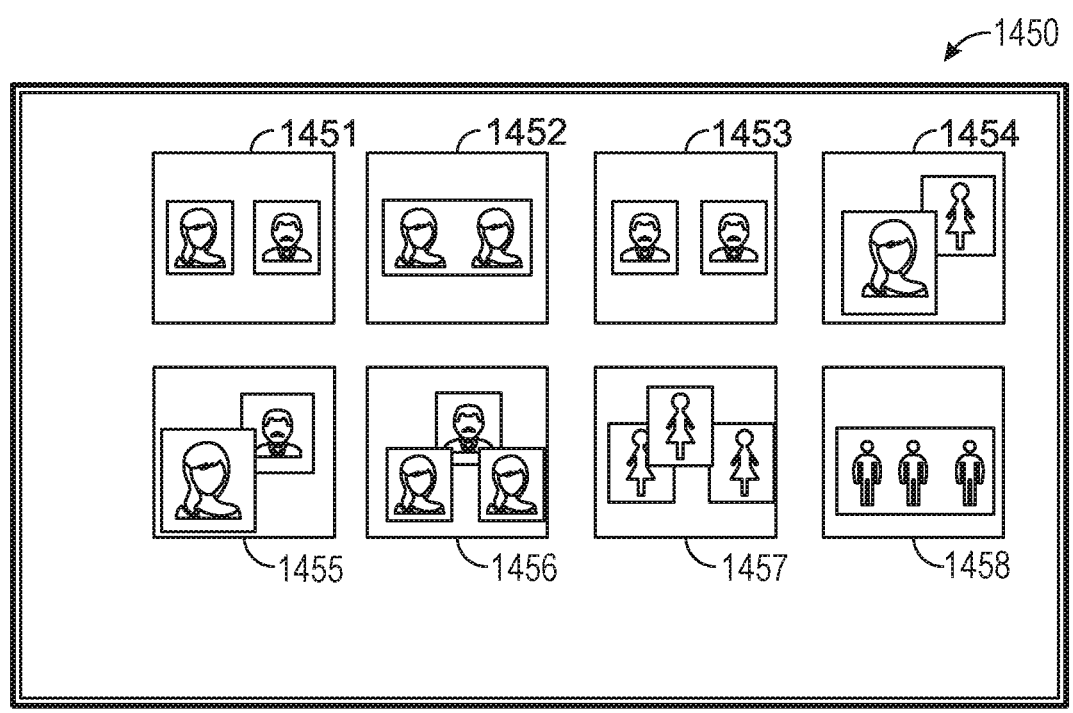

FIGS. 14A and 14B illustrate examples of a user interface for practicing the example process of FIG. 6A via the application 222 of the client 110. In FIG. 14A, the user interface 1400 presents compositional search filters for visually supporting the user in identifying images with a certain composition. A compositional filter is presented that allows the user to select from a grid of compositional options, e.g. head (e.g., 1401, 1402, 1403) or body shot (e.g., 1404, 1405, 1406) on one axis and left (e.g., 1401, 1404), center (e.g., 1402, 1405), or right (e.g., 1403, 1406) on another axis. If the user selects "head shot, left" and queries for "woman", then only images having a representation of women headshots appearing on the left would be presented, filtering out all other images. In FIG. 14B, the user interface 1450 presents commonly desired compositional arrangements by mining user behavioral logs. For example, if analyzing the most commonly downloaded images for the query "group people" reveals that a composition with three people is common, with two people in the foreground and one in the background (e.g., 1456), and then an additional compositional filter can be presented to the user allowing them to select this filter. The user interface 1450 includes a compositional filter that allows the user to select from a grid of compositional arrangement options, e.g., a man and woman side-by-side (e.g., 1451), two woman side-by-side (e.g., 1452), two men side-by-side (e.g., 1453), a headshot in the foreground and a body shot in the background (e.g., 1454), a woman in the foreground and a man in the background (e.g., 1455), two women in the foreground with a man in the background (e.g., 1456), three women with one in the foreground (e.g., 1457) and three men side-by-side (e.g., 1458).

Figure 15:
FIG. 15 illustrates an example of a user interface for practicing the example process of FIG. 7.

FIG. 15 illustrates an example of a user interface for practicing the example process of FIG. 7 via the application 222 of the client 110. In one or more implementations, the user interface 1500 includes an input search query 1501 that indicates a query term (e.g., woman). The image search engine 242 then returns a search result 1502 that may include one or more images with a specific composition that is relevant to the composition indicated by the input search query 1501. In FIG. 15, the search results returned in response to the input search query 1501 include images where the representation of the "woman" is on the left.

The processor 236, using the clustering engine 247, can learn an individual user's most commonly desired compositions and apply that filter to the search results 1502 without any interaction required from the user in order to remove any burden from the user to indicate compositional arrangements. For example, if a user typically downloads images with a single headshot of a woman on the left, future queries from the user can either filter only for those images automatically or apply a weight factor so that images with that characteristic are promoted (or ranked higher) in the search results. The processor 236, using the behavioral data engine 245, can learn the user preferences by analyzing the selections made with respect to the compositional filters (e.g., 1303) and similarly applying that preference to all search queries, regardless of whether the user has explicitly chosen a filter.

Hardware Overview

Figure 16:
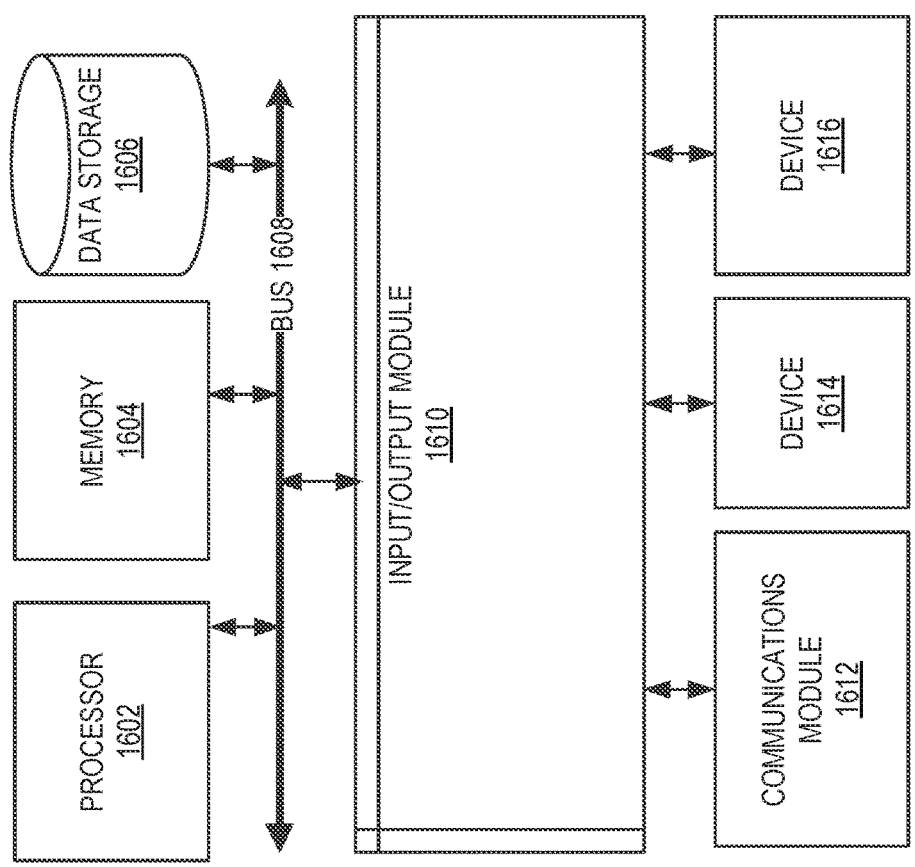
FIG. 16 is a block diagram illustrating an example computer system with which the client and server of FIG. 2 can be implemented.

FIG. 16 is a block diagram illustrating an exemplary computer system 1600 with which the client 110 and server 160 of FIG. 1 can be implemented. In certain aspects, the computer system 1600 may be implemented using hardware or a combination of software and hardware, either in a dedicated server, or integrated into another entity, or distributed across multiple entities.

Computer system 1600 (e.g., client 110 and server 160) includes a bus 1608 or other communication mechanism for communicating information, and a processor 1602 (e.g., processor 212 and 236) coupled with bus 1608 for processing information. By way of example, the computer system 1600 may be implemented with one or more processors 1602. Processor 1602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1600 can include, in addition to hardware, code that creates an execution environment for the computer program in question, e.g., code that constitutes processor firmware, a protocol stack, a database management system, an operating system, or a combination of one or more of them stored in an included memory 1604 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1608 for storing information and instructions to be executed by processor 1602. The processor 1602 and the memory 1604 can be supplemented by, or incorporated in, special purpose logic circuitry.

The instructions may be stored in the memory 1604 and implemented in one or more computer program products, i.e., one or more modules of computer program instructions encoded on a computer readable medium for execution by, or to control the operation of, the computer system 1600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1604 may also be used for storing temporary variable or other intermediate information during execution of instructions to be executed by processor 1602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1600 further includes a data storage device 1606 such as a magnetic disk or optical disk, coupled to bus 1608 for storing information and instructions. Computer system 1600 may be coupled via input/output module 1610 to various devices. The input/output module 1610 can be any input/output module. Exemplary input/output modules 1610 include data ports such as USB ports. The input/output module 1610 is configured to connect to a communications module 1612. Exemplary communications modules 1612 (e.g., communications modules 218 and 238) include networking interface cards, such as Ethernet cards and modems. In certain aspects, the input/output module 1610 is configured to connect to a plurality of devices, such as an input device 1614 (e.g., input device 216) and/or an output device 1616 (e.g., output device 214). Exemplary input devices 1614 include a keyboard and a pointing device, e.g., a mouse or a trackball, by which a user can provide input to the computer system 1600. Other kinds of input devices 1614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1616 include display devices, such as a LCD (liquid crystal display) monitor, for displaying information to the user.

According to one aspect of the present disclosure, the client 110 and server 160 can be implemented using a computer system 1600 in response to processor 1602 executing one or more sequences of one or more instructions contained in memory 1604. Such instructions may be read into memory 1604 from another machine-readable medium, such as data storage device 1606. Execution of the sequences of instructions contained in main memory 1604 causes processor 1602 to perform the process steps described herein. One or more processors in a multi-processing arrangement may also be employed to execute the sequences of instructions contained in memory 1604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1600 can include clients and servers. A client and server are generally remote from each other and typically interact through a communication network. The relationship of client and server arises by virtue of computer programs running on the respective computers and having a client-server relationship to each other. Computer system 1600 can be, for example, and without limitation, a desktop computer, laptop computer, or tablet computer. Computer system 1600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1602 for execution. Such a medium may take many forms, including, but not limited to, non-volatile media, volatile media, and transmission media. Non-volatile media include, for example, optical or magnetic disks, such as data storage device 1606. Volatile media include dynamic memory, such as memory 1604. Transmission media include coaxial cables, copper wire, and fiber optics, including the wires that comprise bus 1608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    training a computer-operated convolutional neural network to recognize an object in a region of an image as salient using feature descriptor vectors obtained from extracted features of each saliency region of a training image;
    for each image in a set of images, determining a compositional vector representing one or more objects and corresponding locations within the image using the trained computer-operated convolutional neural network;
    providing each image through a clustering algorithm to produce one or more clusters based on compositional similarity, wherein the clustering algorithm maps each image to a cluster representing one of a plurality of predetermined compositional classes;
    providing images from the set of images clustered by composition, the images including a different listing of images for each of the one or more clusters; and
    transmitting, from a server to a client device for display by the client device, a set of search results responsive to a user search query, the set of search results including a prioritized listing of the images from each cluster of compositional similarity identified for display for a respective composition.

2. The computer-implemented method of claim 1, further comprising:
    receiving, from the client device, a user input identifying the user search query for content, the user input indicating one or more queries that indicate a specific composition for an image; and
    determining search results that are responsive to the user search query, wherein each image processed through the trained computer-operated convolutional neural network is provided from the search results.

3. The computer-implemented method of claim 1, further comprising: defining a distance function that determines a cosine angle difference between at
    least two compositional vectors,
    wherein each image is processed through the clustering algorithm using the distance function.

4. The computer-implemented method of claim 1, further comprising:
    defining a distance function that determines a cosine similarity between the compositional vector representing the image and a compositional vector representing one of the plurality of predetermined compositional classes,
    wherein each image is processed through the clustering algorithm using the distance function.

5. The computer-implemented method of claim 4, wherein the distance function determines a cosine angle difference between the compositional vector representing the image and the compositional vector representing the predetermined compositional class.

6. The computer-implemented method of claim 4, wherein the distance function determines a cosine distance between the compositional vector representing the image and the compositional vector representing the predetermined compositional class.

7. The computer-implemented method of claim 1, further comprising:
    storing a metadata of each image in an image collection, the metadata of each image indicating a compositional class for the image,
    wherein each image processed through the trained computer-operated convolutional neural network is provided from the image collection.

8. The computer-implemented method of claim 7, wherein the prioritized listing of the images includes a different listing of images for each cluster of compositional similarity based on the metadata of each image associated with the cluster.

9. The computer-implemented method of claim 1, further comprising:
    determining a predetermined number of compositional classes;
    for each of the predetermined compositional classes, generating an icon representation of a composition corresponding to a compositional class;
    providing, for display, a user-selectable control to filter search results responsive to a user search query, the user-selectable control including one or more icon representations corresponding to respective clusters of compositional classes;
    identifying a set of images that corresponds to a compositional class associated with a user-selected icon representation based on a user interaction with the user-selectable control; and
    providing a prioritized listing of images from the set of images for display on the client device.

10. The computer-implemented method of claim 1, further comprising:
    determining a centroid vector for each of the one or more clusters;
    generating an icon representation of a composition corresponding to the centroid vector, the icon representation indicating a compositional class of the cluster;
    providing, for display, a user-selectable control to filter search results responsive to a user search query, the user-selectable control including one or more icon representations corresponding to respective clusters of compositional classes;
    identifying a set of images that corresponds to a compositional class associated with a user-selected icon representation based on user interaction with the user-selectable control; and
    providing a prioritized listing of images from the set of images for display on the client device.

11. The computer-implemented method of claim 1, further comprising:
    obtaining behavioral data from session logs associated with a user;
    generating a compositional profile for the user, the compositional profile including an N-dimensional vector where each element of the N-dimensional vector indicates a probability that a next image corresponds to a compositional class associated with the element, wherein N corresponds to a number of clusters produced; and
    for each image in the set of search results, applying a score based on an element from the N-dimensional vector in the compositional profile, the element corresponding to a compositional class of the image, wherein images from the prioritized listing of the images are prioritized based on the score applied to each image, and wherein each image processed through the trained computer-operated convolutional neural network is provided from the behavioral data.

12. The computer-implemented method of claim 1, further comprising:

providing a set of training images for each object class of a plurality of object classes to the trained computer-operated convolutional neural network;

for each object class of the plurality of object classes, training the computer-operated convolutional neural network to recognize an object in a region of an image as salient from the feature descriptor vectors; and providing the trained computer-operated convolutional neural network to recognize salient objects with localization in images.

13. A system, comprising:

one or more processors; and a computer-readable storage medium coupled to the one or more processors, the computer-readable storage medium including instructions that, when executed by the one or more processors, cause the one or more processors to:

train a computer-operated convolutional neural network to recognize an object in a region of an image as salient using feature descriptor vectors obtained from extracted features of each saliency region of a training image;

for each image in a set of images, determine a compositional vector representing one or more objects and corresponding locations within the image using the computer-operated convolutional neural network;

provide each image through a clustering algorithm to produce one or more clusters based on compositional similarity, wherein the clustering algorithm maps each image to a cluster representing one of a plurality of predetermined compositional classes;

provide images from the set of images clustered by composition, the images including a different listing of images for each of the one or more clusters;

store a metadata of each image in an image collection, the metadata of each image indicating a compositional class for the image; and transmit, from a server to a client device for display by the client device, a prioritized listing of images responsive to a user search query, the prioritized listing of images including a different listing of images for each cluster of compositional similarity based on the metadata of each image associated with the cluster identified for display for a respective composition.

14. The system of claim 13, wherein the instructions further cause the one or more processors to:

define a distance function that determines a cosine angle difference between at least two compositional vectors, wherein each image is processed through the clustering algorithm using the distance function.

15. The system of claim 13, wherein the instructions further cause the one or more processors to:

define a distance function that determines a cosine similarity between the compositional vector representing the image and a compositional vector representing one of the plurality of predetermined compositional classes, wherein each image is processed through the clustering algorithm using the distance function.

16. The system of claim 15, wherein the distance function determines a cosine angle difference between the compositional vector representing the one or more objects and corresponding locations within the image and the compositional vector representing the predetermined compositional class.

17. The system of claim 13, wherein the instructions further cause the one or more processors to:

determine a predetermined number of compositional classes;

for each of the predetermined compositional classes, generate an icon representation of a composition corresponding to the compositional class;

provide, for display, a user-selectable control to filter search results responsive to a user search query, the user-selectable control including one or more icon representations corresponding to respective clusters of compositional classes;

identify a set of images that correspond to a compositional class associated with a user-selected icon representation based on user interaction with the user-selectable control; and provide, for transmission, a prioritized listing of images from the set of images for display on the client device.

18. The system of claim 13, wherein the instructions further cause the one or more processors to:

determine a centroid vector for each of the one or more clusters;

generate an icon representation of a composition corresponding to the centroid vector, the icon representation indicating a compositional class of the cluster;

provide, for display, a user-selectable control to filter search results responsive to a user search query, the user-selectable control including one or more icon representations corresponding to respective clusters of compositional classes;

identify a set of images that corresponds to a compositional class associated with a user-selected icon representation based on user interaction with the user-selectable control; and provide, for transmission, a prioritized listing of images from the set of images for display on a client device.

19. The system of claim 13, wherein the instructions further cause the one or more processors to:

obtain behavioral data from session logs associated with a user;

generate a compositional profile for the user, the compositional profile including an N-dimensional vector where each element of the N-dimensional vector indicates a probability that a next image corresponds to a compositional class associated with the element, wherein N corresponds to a number of clusters produced; and for each image in the prioritized listing of images, apply a score based on an element from the N-dimensional vector in the compositional profile, the element corresponding to a compositional class of the image, wherein images from the prioritized listing of images are prioritized based on the score applied to each image, and wherein each image processed through the computer-operated convolutional neural network is provided from the behavioral data.

20. A computer-implemented method, comprising:
receiving, over a transmission at a server from a client device, a user input via an application on the client device to initiate an image search, the user input indicating one or more queries that define a specific composition for an image;
generating, in response to the user input, an image search query from the user input;
providing, for transmission, the image search query over a connection to the server, the server including an image search service that obtains a set of images responsive to the image search query based on a cosine similarity between a compositional vector associated with the image search query and one or more compositional vectors of corresponding images from an image collection, the image search service clustering the set of images using a trained computer-operated convolutional neural network configured to recognize an object in a region of an image as salient using feature descriptor vectors obtained from extracted features of each saliency region of a training image, and based on composition similarity using a clustering algorithm mapping each image to a cluster representing one of a plurality of predetermined compositional classes; and
receiving a set of search results responsive to the image search query from the server, the set of search results including a prioritized listing of images identified for display by the client device for a respective composition.

\* \* \* \* \*